(12) United States Patent
Maruyama et al.

(10) Patent No.: US 9,163,645 B2
(45) Date of Patent: Oct. 20, 2015

(54) VEHICLE BRAKE SYSTEM

(71) Applicants: ADVICS CO., LTD., Kariya-shi (JP); TOYOTA JIDOSHA KABUSHIKI KAISHA, Toyota-shi (JP)

(72) Inventors: Masaki Maruyama, Nagoya (JP); Yoshio Masuda, Kariya (JP); Akitaka Nishio, Kariya (JP); Akira Sakai, Toyota (JP); Yasuji Mizutani, Toyota (JP); Kiyoyuki Uchida, Konan (JP); Masaaki Komazawa, Miyoshi (JP); Yusuke Kamiya, Okazaki (JP)

(73) Assignee: ADVICS CO., LTD., Aichi-Pref., Kariya-Shi (JP)

( * ) Notice: Subject to any disclaimer, the term of this patent is extended or adjusted under 35 U.S.C. 154(b) by 57 days.

(21) Appl. No.: 14/238,991

(22) PCT Filed: Mar. 22, 2013

(86) PCT No.: PCT/JP2013/058291
§ 371 (c)(1),
(2) Date: Feb. 14, 2014

(87) PCT Pub. No.: WO2013/146588
PCT Pub. Date: Oct. 3, 2013

(65) Prior Publication Data
US 2014/0250883 A1 Sep. 11, 2014

(30) Foreign Application Priority Data

Mar. 30, 2012 (JP) ................................. 2012-082512

(51) Int. Cl.
*F15B 13/02* (2006.01)
*B60T 8/172* (2006.01)
(Continued)

(52) U.S. Cl.
CPC ................. *F15B 13/02* (2013.01); *B60T 8/172* (2013.01); *B60T 8/3265* (2013.01); *B60T 8/4077* (2013.01); *B60T 17/18* (2013.01); *B60T 8/3275* (2013.01); *B60T 8/4081* (2013.01); *B60T 2201/03* (2013.01)

(58) Field of Classification Search
CPC ...... F15B 13/02; B60T 8/4077; B60T 8/3265; B60T 17/18; B60T 8/172; B60T 8/3275; B60T 8/4081
USPC .......................................................... 60/591
See application file for complete search history.

(56) References Cited

U.S. PATENT DOCUMENTS 8,272,700 B2 * 9/2012 Suzuki et al. .................... 60/554
8,376,473 B2 * 2/2013 Isono et al. ................. 303/114.1
(Continued)

FOREIGN PATENT DOCUMENTS

CN 1827437 A 9/2006
CN 101365611 A 2/2009
(Continued)

OTHER PUBLICATIONS

Office Action issued on Jan. 23, 2015, by the Chinese Patent Office in corresponding Chinese Patent Application No. 201380003089.0. (5 page).
(Continued)

*Primary Examiner* — Thomas E Lazo
(74) *Attorney, Agent, or Firm* — Buchanan Ingersoll & Rooney PC

(57) ABSTRACT

A vehicle brake system includes a cylinder, a master piston including a pressure applying piston and a projection portion, a servo chamber, a contact/separation determining means determining a separated state and a contact state between the input piston and the master piston, a pilot pressure generating device generating a pilot pressure, a servo pressure generating device, a servo pressure measuring device measuring a servo pressure, and a master pressure estimating means estimating a master pressure from the pilot pressure and a first servo ratio, which is a cross-sectional area ratio between a first pilot chamber and a servo pressure generating chamber, in a case of the separated state, and estimating the master pressure based on the servo pressure, the pilot pressure and a second servo ratio, which is a cross-sectional area ratio between a second pilot chamber and the servo pressure generating chamber, in a case of the contact state.

2 Claims, 8 Drawing Sheets

(51) Int. Cl.
  *B60T 17/18*   (2006.01)
  *B60T 8/32*    (2006.01)
  *B60T 8/40*    (2006.01)

(56) References Cited

U.S. PATENT DOCUMENTS

| | | | |
|---|---|---|---|
| 9,010,880 B2 * | 4/2015 | Yamasoe et al. | ........... 303/114.1 |
| 2008/0210499 A1 | 9/2008 | Isono et al. | |
| 2008/0236962 A1 | 10/2008 | Suzuki et al. | |

FOREIGN PATENT DOCUMENTS

| | | |
|---|---|---|
| GB | 1 555 075 A | 11/1979 |
| JP | 52-101375 A | 8/1977 |
| JP | 2007-203804 A | 8/2007 |
| JP | 2012-16984 A | 1/2012 |

OTHER PUBLICATIONS

International Search Report (PCT/ISA/210) mailed on Jun. 18, 2013, by the Japanese Patent Office as the International Searching Authority for International Application No. PCT/JP2013/058291.

* cited by examiner

Cylinder Opening side ⟵⟶ Cylinder Bottom Surface side

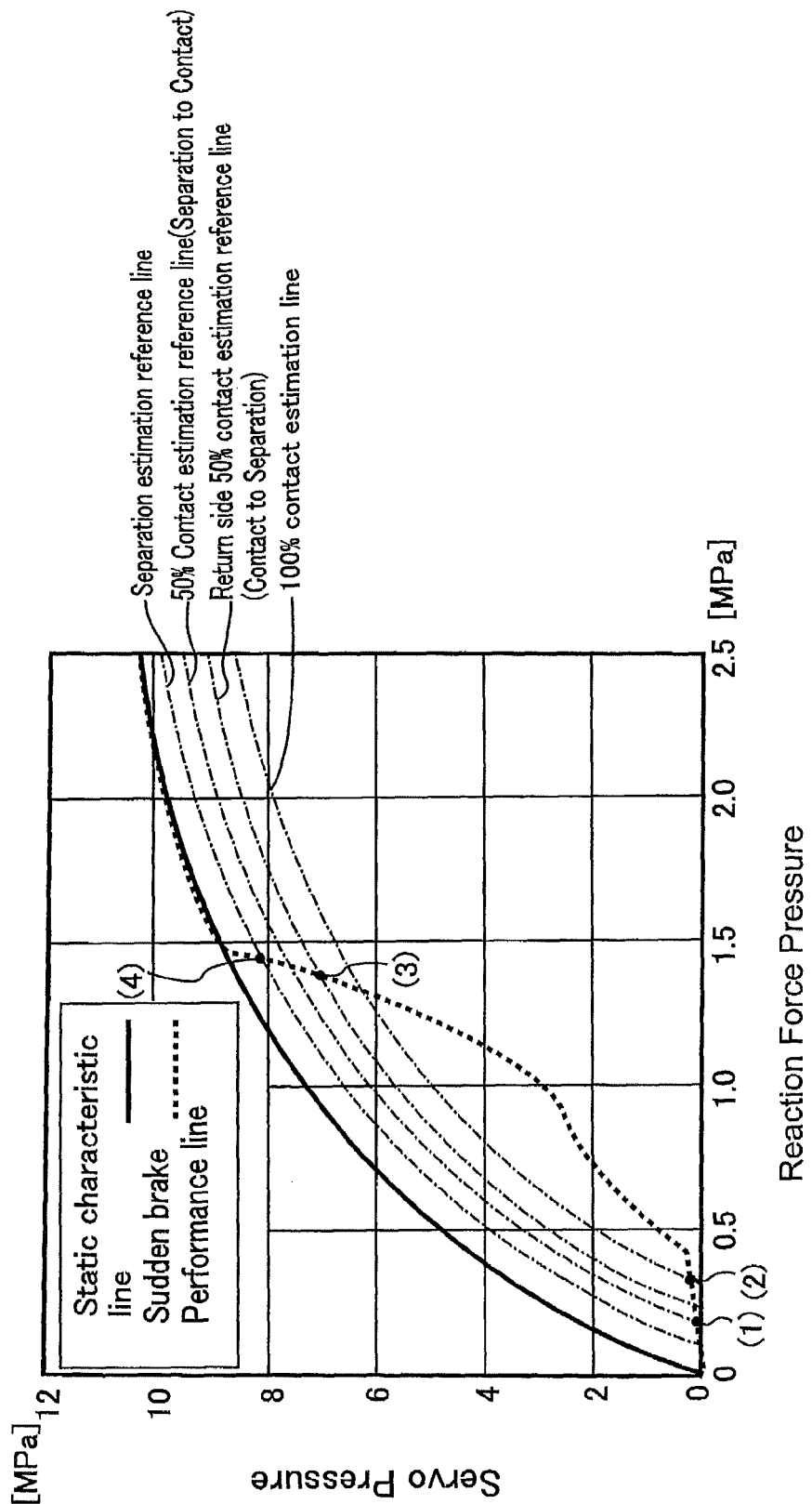

VEHICLE BRAKE SYSTEM

TECHNICAL FIELD

This invention relates to a vehicle brake system that applies a braking force to a vehicle.

BACKGROUND OF THE TECHNOLOGY

As an example of a vehicle brake system that applies a braking force to a vehicle, a brake system for a hybrid vehicle disclosed in, for example, the patent document 1 is known. According to the vehicle brake system disclosed in the patent document 1, an input piston and a master piston are retained while being spaced apart from each other by a predetermined distance. A required friction braking force is calculated by removing a regenerative braking force from a required braking force which is calculated on the basis of a detected amount of movement of the input piston. A servo pressure generated by a pressure accumulating portion (an accumulator) and a linear valve is applied to the master piston on the basis of the required friction braking force, thereby the master piston is moved and a master pressure is generated. The master pressure is applied to a wheel cylinder, and the friction braking force is generated by the master pressure.

Patent Document 1: JP2012-16984A

DISCLOSURE OF INVENTION

Problems to be Solved

According to the vehicle brake system disclosed in the patent document 1, when a brake pedal is pressed hard and suddenly, the input piston may contact the master piston. In the case that the input piston contacts the master piston, a pressing force is applied to the master piston from the input piston in addition to the above-mentioned servo pressure. Accordingly, an excessive master pressure compared to the master pressure based on the required friction braking force may be generated.

While the ABS (an anti-lock brake system) is activated, the master pressure is adjusted while controlling the regenerative braking force to be 0 (zero) in order to prevent wheels from slipping. Generally, an estimated master pressure is calculated on the basis of the amount of movement of the input piston and the like, and the ABS is controlled on the basis of the estimated master pressure. However, as described above, in the case that the input piston contacts the master piston, the excessive master pressure is generated, and accordingly an actual master pressure deviates from the estimated master pressure, which may negatively affect the control of the ABS. If a contact of the input piston with the master piston can be estimated, such estimation may be useful in estimating the master pressure. Furthermore, if the master pressure generated while the input piston is spaced apart from the master piston and the master pressure generated while the input piston is in contact with the master piston are accurately estimated, performance of a brake control such as the ABS may be enhanced.

The present invention was made in consideration with the above-mentioned situation and the objective of the invention is to provide a vehicle brake system, in which an input piston and a master piston are held in a state where the input piston and the master piston are spaced apart from each other, and which is configured to accurately estimate a master pressure generated while the input piston is spaced apart from the master piston and the master pressure generated while the input piston is in contact with the master piston.

Means for Solving the Problem

The feature in structure of the invention according to a first aspect includes a cylinder; a master piston fitted into the cylinder while being allowed to be slidably movable in an axial direction and including a pressure applying piston and a projection portion, the pressure applying piston defining a master chamber, through which a master pressure is applied to a plurality of wheel cylinders, together with a front portion of the cylinder, and the projection portion provided at a location rearward of the pressure applying piston, penetrating an intermediate wall of the cylinder so as to project rearward, and having a smaller diameter than the cylinder; an input piston penetrating a rear wall of the cylinder while being allowed to be slidably movable in the axial direction, and a front end surface of the input piston being spaced apart from a rear end surface of the projection portion of the master piston located at a retreated end position by a predetermined distance while the input piston is located at a retreated end position; a servo chamber formed between a rear shoulder portion, which is provided between the pressure applying piston and the projection portion, and the intermediate wall of the cylinder; a contact/separation determining means determining a separated state where the front end surface of the input piston and the rear end surface of the projection portion are spaced apart from each other, and a contact state where a contact therebetween is established; a pilot pressure generating device generating a pilot pressure corresponding to an amount of movement of the input piston; a servo pressure generating device including a first valve body fitted into a first valve bore formed at a housing while being allowed to be slidably movable and dividing the first valve bore into a first pilot chamber in communication with the pilot pressure generating device and a servo pressure generating chamber in communication with the servo chamber, a valve mechanism connecting the servo pressure generating chamber either with a pressure accumulating device or a reservoir in response to a movement of the first valve body, and a second valve body fitted into a second valve bore, which is formed at the housing so as to extend from the first valve bore and to have a smaller diameter than the first valve bore, while allowing the second valve body to contact/separate with/from the first valve body and dividing the second valve bore into the first pilot chamber and a second pilot chamber in communication with the master chamber; a servo pressure measuring device measuring the servo pressure; and a master pressure estimating means estimating the master pressure on the basis of the pilot pressure and a first servo ratio, which is a cross-sectional area ratio between the first pilot chamber and the servo pressure generating chamber, in a case that the contact/separation determining means determines the separated state, and estimating the master pressure on the basis of the servo pressure measured by the servo pressure measuring device, the pilot pressure and a second servo ratio, which is a cross-sectional area ratio between the second pilot chamber and the servo pressure generating chamber, in a case that the contact/separation determining means determines the contact state.

The feature in structure of the invention according to a second aspect is characterized in that in the first aspect, the contact/separation determining means determines a level of the contact between the front end surface of the input piston and the rear end surface of the projection portion, and the master pressure estimating means calculates a third servo ratio within a range between the first servo ratio and the second servo ratio depending on the level of the contact determined by the contact/separation determining means and estimates the master pressure on the basis of the measured servo pressure, the pilot pressure and the third servo ratio.

According to the invention of the first aspect, in a case that a brake pedal is pressed slowly, the master piston and the input piston are spaced apart from each other, and the master pressure of the master chamber is generated only by the servo pressure of the servo chamber. The servo pressure of the servo chamber is the servo pressure generated at the servo pressure generating chamber. In the above-described separated state, the servo pressure is generated at the servo pressure generating chamber only by the pilot pressure of the first pilot chamber. Accordingly, an accurate master pressure is estimable on the basis of the pilot pressure and the first servo ratio, which is the cross-sectional area ratio between the first pilot chamber and the servo pressure generating chamber.

On the other hand, in a case that the brake pedal is pressed hard and suddenly, the master piston and the input piston are in a contact state, and the master pressure of the master chamber is generated by a pressure, which is the sum of the servo pressure of the servo chamber and a pressing force of a brake operation. The master pressure is returned to the second pilot chamber and generates the servo pressure at the servo pressure generating chamber together with the pilot pressure of the first pilot chamber. Accordingly, the accurate master pressure is estimable on the basis of the servo pressure, the pilot pressure, and the second servo ratio, which is the cross-sectional area ratio between the second pilot chamber and the servo pressure generating chamber. As a result, the performance of the brake control such as the ABS and the like may be enhanced. Furthermore, a sensor for detecting the master pressure is not necessary, which may result in a reduction of costs.

According to the invention of the second aspect, the master pressure estimating means calculates the third servo ratio within the range between the first servo ratio and the second servo ratio depending on the contact level determined by the contact/separation determining means. Consequently, a further accurate master pressure is estimable compared to a case where the master pressure is estimated by switching the first and second servo ratios, which are constant in the separated state.

BRIEF EXPLANATION OF ATTACHED DRAWINGS

FIG. 5 is a graph showing a mapping data used for estimating the contact of the input piston with the master piston in a second process for estimating the contact of the input piston.

THE BEST MODE EMBODIMENTS OF THE INVENTION (An Explanation of a Hybrid Vehicle)

An embodiment of the present invention will be described below with reference to the attached drawings. A hybrid vehicle (which is hereinafter referred to simply as a vehicle), to which a friction brake system B (a vehicle brake system) of the embodiment is mounted, is configured to drive driving wheels such as e.g. a front left wheel Wfl and a front right wheel Wfr by an engine and a motor generator. A regenerative brake system (not illustrated) is configured by the above-mentioned motor generator. The regenerative brake system generates a regenerative braking force at the front left wheel Wfl and the front right wheel Wfr by the motor generator. The motor generator may be configured to include a motor and a generator as separate components.

A brake disc, which rotates integrally with each wheel Wfl, Wfr, Wrl, Wrr as a unit, and a friction brake, which generates a friction braking force by pressing a brake pad to the brake disc, are provided in the vicinity of each wheel Wfl, Wfr, Wrl, Wrr. Each friction brake is provided with each wheel cylinder WCfl, WCfr, WCrl, WCrr, which is configured to press the above-mentioned brake pad to the brake disc by a master pressure generated by a below-described master cylinder 1 (see FIG. 1).

(An Explanation of the Vehicle Brake System)

Figure 1:
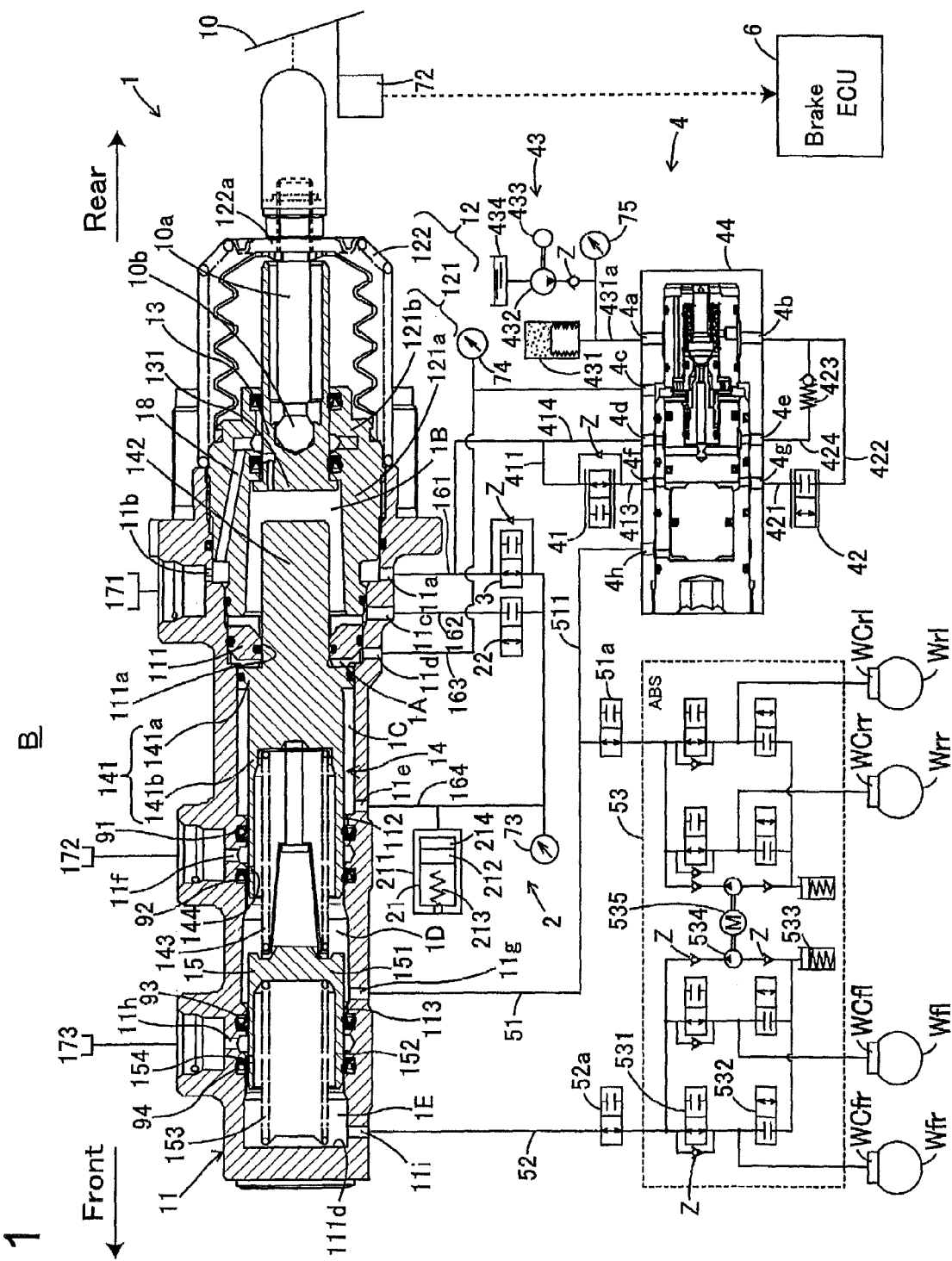
FIG. 1 is a partial sectional-explanatory view illustrating a configuration of a vehicle brake system according to an embodiment.

The friction brake system B (the vehicle brake system) of the embodiment mainly includes the master cylinder 1, a reaction force generating device 2, a separation lock valve 22, a reaction force valve 3, a servo pressure generating device 4, an ABS 53, a brake ECU 6, and various sensors 72-75, which are configured to communicate with the brake ECU 6, as illustrated in FIG. 1.

(An Explanation of the Master Cylinder)

As illustrated in FIG. 1, the master cylinder 1 supplies a brake fluid to the ABS 53, then to the wheel cylinders WCfl, WCfr, WCrl, WCrr. The master cylinder 1 mainly includes a main cylinder 11, a cover cylinder 12, an input piston 13, a first master piston 14 (which corresponds to a "master piston" of the present invention), and a second master piston 15 (which corresponds to a "pressure applying piston" of the present invention).

The main cylinder 11 is formed in a substantially bottomed cylinder shape having an opening at one end thereof and a bottom surface at the other end. Hereinafter, the master cylinder 1 will be explained while defining the opening side of the main cylinder 11 as a rear and the bottom surface side (a closed side) thereof as a front. The main cylinder 11 includes therein an intermediate wall 111, which separates the opening side (the rear side) and the bottom surface side (the front side) of the main cylinder 11. In other words, the intermediate wall 111 is formed at an intermediate portion of an inner circumferential surface of the main cylinder 11 and extends along an entire circumference in the axial direction. An inner circumferential surface of the intermediate wall 111 serves as a through hole 111a opening in the axial direction (in a front-rear direction).

The main cylinder 11 includes therein a small diameter portion 112 (front) and a small diameter portion 113 (rear), at which an inner diameter of the main cylinder 11 is smaller than the rest, at locations forwardly of the intermediate wall 111. In other words, the small diameter portions 112, 113 project from the entire inner circumferential surface of a portion of the main cylinder 11 in an axial direction. The below-mentioned master pistons 14, 15 are provided inside the main cylinder 11 while allowing the master pistons 14, 15 to be slidably movable in the axial direction. Ports and the like which interconnect the inside and outside of the main cylinder 11 will be described below.

The cover cylinder 12 includes a cylinder portion 121 in a substantially cylinder shape and a cup-shaped cover portion 122. The cylinder portion 121 is arranged at a rear end of the main cylinder 11 and is coaxially fitted into the opening of the main cylinder 11. An inner diameter of a front portion 121a of the cylinder portion 121 is formed to be greater than an inner diameter of a rear portion 121b thereof. Furthermore, the inner diameter of the front portion 121a is formed to be greater than an inner diameter of the through hole 111a of the intermediate wall 111.

The cover portion 122 is attached to the rear end portion of the main cylinder 11 and an outer circumferential surface of the cylinder portion 121 so as to cover the opening of the main cylinder 11 and a rear end opening of the cylinder portion 121. A through hole 122a is formed at a bottom wall of the cover portion 122. The cover portion 122 is made of an elastic material expandable and contractible in the axial direction and the bottom wall thereof is biased in a rearward direction.

The input piston 13 is configured to slidably move inside the cover cylinder 12 in response to an operation of a brake pedal 10. The input piston 13 is provided inside the cover cylinder 12 at a location rearward of a projection portion 142 of the first master piston 14, which will be described in detail below, while being spaced apart from the projection portion 142 and allowing the input piston 13 to be slidably movable in the axial direction. The input piston 13 is formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The input piston 13 is arranged so that the bottom wall 131 is positioned at a rear end of the inside of the front portion 121a formed at the cylinder portion 121. Furthermore, the input piston 13 is fluid-tightly provided inside the rear portion 121b of the cylinder portion 121 while allowing the input piston 13 to be slidably movable in the axial direction.

An operation rod 10a of the brake pedal 10 is inserted into the input piston 13 from a rear end thereof to the front. The operation rod 10a and the input piston 13 are connected with one another by a pivot 10b, which is formed at an end portion (a front end portion) of the operation rod 10a. The operation rod 10a projects towards the outside through the opening of the input piston 13 and the through hole 122a of the cover portion 122, and is connected to the brake pedal 10. The operation rod 10a moves in response to the operation to the brake pedal 10. More specifically, when the brake pedal 10 is pressed, the operation rod 10a advances in a forward direction while pressing the cover portion 122 in the axial direction. As described above, the brake pedal 10 transmits an operating force (pressing force) applied thereto by a driver to the input piston 13. The input piston 13 also advances in response to the forward movement of the operation rod 10a.

The first master piston 14 is arranged within the main cylinder 11, which is arranged at a location forward of the input piston 13, while allowing the first master piston 14 to be slidably movable in the axial direction. More specifically, the first master piston 14 includes a first pressure applying piston portion 141 and the projection portion 142. The first pressure applying piston portion 141 is arranged coaxially within the main cylinder 11 at a location forward of the intermediate wall 111. The first pressure applying piston portion 141 is formed in a substantially bottomed cylinder shape having an opening at a front portion thereof and a servo pressure receiving portion 141a at a rear portion thereof. In other words, the first pressure applying piston portion 141 includes the servo pressure receiving portion 141a and a circumferential wall portion 141b.

The servo pressure receiving portion 141a is provided inside the main cylinder 11 at a location forward of the intermediate wall 111 in a fluid-tight manner while allowing the servo pressure receiving portion 141a to be slidably movable in the axial direction. More specifically, the servo pressure receiving portion 141a is formed to protrude at an outer circumferential surface of the first pressure applying piston portion 141 in a radially outward direction along the entire circumference thereof. The servo pressure receiving portion 141a faces a front end surface of the intermediate wall 111. The circumferential wall portion 141b is formed in a cylinder shape having a smaller diameter than the servo pressure receiving portion 141a and extends coaxially from a front end surface of the servo pressure receiving portion 141a in the forward direction. A front portion of the circumferential wall portion 141b is provided to be slidably movable in the axial direction relative to the small diameter portion 112 and in fluid-tightly therewith, while allowing the front portion of the circumferential wall portion 141b to be slidably movable in the axial direction relative to the small diameter portion 112. A rear portion of the circumferential wall portion 141b is spaced apart from the inner circumferential surface of the main cylinder 11.

The projection portion 142 is a column-shaped portion projecting rearward from a center of a rear end surface of the first pressure applying piston portion 141. The projecting portion 142 is formed to have a smaller diameter than the first pressure applying piston portion 141. The projection portion 142 is provided so as to penetrate into the through hole 111a of the intermediate wall 111 and to be slidably movable in the axial direction. Additionally, an outer circumferential surface of the projection portion 142 and an inner circumferential surface of the through hole 111a are kept to be fluid-tight by a sealing member attached to the through hole 111a for contacting the entire outer circumferential surface of the projection portion 142. A rear portion of the projection portion 142 projects rearward from the through hole 111a to the inside of the cylinder portion 121. The rear portion of the projection portion 142 is spaced apart from an inner circumferential surface of the cylinder portion 121. A rear end surface of the projection portion 142 is spaced apart from the bottom wall 131 of the input piston 13 by a predetermined distance. The first master piston 14 is biased in the rearward direction by a biasing member 143 including, for example, a spring and the like.

A "servo chamber 1A" is defined by a rear end surface of the servo pressure receiving portion 141a formed at the first pressure applying piston portion 141, the front end surface of the intermediate wall 111, a portion of the inner circumferential surface of the main cylinder 11 located forward of the intermediate wall 111, and the outer circumferential surface of the projection portion 142. A "separation chamber 1B" is defined by a rear end surface of the intermediate wall 111, an outer surface of the input piston 13, an inner circumferential surface of the front portion 121a formed at the cylinder portion 121, and an outer surface of the projection portion 142. A "reaction force pressure chamber 10" is defined by a rear end surface of the small diameter portion 112 (including a sealing member 91), an outer circumferential surface of the circumferential wall portion 141b, the front end surface of the servo pressure receiving portion 141a, and the inner circumferential surface of the main cylinder 11. In other words, a large diameter portion (which serves as the reaction force pressure chamber 1C) having a larger diameter than the second master piston 15 is formed at the first master piston 14 at a location between the second master piston 15 and the projection portion 142. A rear shoulder portion of the servo pressure receiving portion 141a is formed between the large diameter portion and the projection portion 142. The reaction force pressure chamber 1C is defined by a front shoulder portion of the servo pressure receiving portion 141a formed between the large diameter portion and the first master piston 14, an outer circumferential surface of the first master piston 14, and a large diameter bore portion of the main cylinder 11 through which the large diameter portion slidably moves.

The second master piston 15 is coaxially arranged within the main cylinder 11 at a location forward of the first master piston 14. The second master piston 15 is formed in a substantially bottomed cylinder shape having an opening at a front portion thereof and a bottom wall (a second pressure applying piston portion 151) at a rear portion thereof. More specifically, the second master piston 15 includes the second pressure applying piston portion 151 formed in a column shape and a circumferential wall portion 152 projecting in the forward direction from the second pressure applying piston portion 151. The second pressure applying piston portion 151 is arranged between the small diameter portions 112, 113 at a location forward of the first master piston 14. The rear portion of the second master piston 15 including the second pressure applying piston portion 151 is spaced apart from the inner circumferential surface of the main cylinder 11. The circumferential wall portion 152 is formed in a cylindrical shape and coaxially and extends forward from an outer edge of the second pressure applying piston portion 151. The circumferential wall portion 152 is fluid-tightly provided slidably movable in the axial direction relative to the small diameter portion 113 and in fluid-tightly therewith, while allowing the circumferential wall portion 152 to be slidably movable within the small diameter portion 113 in the axial direction. The second master piston 15 is biased in the rearward direction by a biasing member 153 including, for example, a spring and the like.

A "first master chamber 1D" is defined by an outer surface of the second master piston 15, a front end surface of the first master piston 14, an inner surface of the first maser piston 14, a front end surface of the small diameter portion 112 (including a sealing member 92), a rear end surface of the small diameter portion 113 (including a sealing member 93), and the inner circumferential surface of the main cylinder 11 between the small diameter portions 112, 113 (the inner surface of the main cylinder 11 located forward of the intermediate wall 111). Furthermore, a "second master chamber 1E" is defined by a bottom surface 111d inside the main cylinder 11, a front end surface of the second master piston 15, an inner surface of the second master piston 15, a front end surface of the small diameter portion 113 (including a sealing member 94), and the inner circumferential surface of the main cylinder 11.

Ports 11a to 11i, which connect the inside and the outside, are formed at the master cylinder 1. The port 11a is formed at the main cylinder 11 at a location rearward of the intermediate wall 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylinder portion 121. The port 11a is connected to a conduit 161. The port 11b is connected to a reservoir 171. In other words, the port 11a is in communication with the reservoir 171.

The port 11b is in communication with the separation chamber 1B via a passage 18 formed at the cylinder portion 121 and the input piston 13. The passage 18 is divided when the input piston 13 moves forward. In other words, when the input piston 13 moves forward, the separation chamber 1B and the reservoir 171 are disconnected from each other.

The port 11c is formed at a location forward of the port 11a and connects the separation chamber 1B with a conduit 162. The port 11d is formed at a location forward of the port 11c and connects the servo chamber 1A with a conduit 163. The port 11e is formed at a location forward of the port 11d and connects the reaction force pressure chamber 1C with a conduit 164.

The port 11f is formed between the sealing members 91, 92 of the small diameter portion 112 and connects a reservoir 172 with the inside of the main cylinder 11. The port 11f is in communication with the first master chamber 1D via a passage 144 formed at the first master piston 14. The passage 144 is formed at a location slightly rearward of the sealing member 92 so that the port 11f and the first master chamber 1D are disconnected from each other when the first master piston 14 moves forward.

The port 11g is formed at a location forward of the port 11f and connects the first master chamber 1D with a conduit 51. The port 11h is formed between the sealing members 93, 94 of the small diameter portion 113 and connects a reservoir 173 with the inside of the main cylinder 11. The port 11g is in communication with the second master chamber 1E via a passage 154 formed at the second master piston 15. The passage 154 is formed at a location slightly rearward of the sealing member 94 so that the port 11g and the second master chamber 1E are disconnected from each other when the second master piston 15 moves forward. The port 11i is formed at a location forward of the port 11h and connects the second master chamber 1E with a conduit 52.

A sealing member such as an O-ring and the like (see black dots in FIG. 1) are appropriately provided within the master cylinder 1. The sealing members 91, 92 are provided at the small diameter portion 112 and fluid-tightly contact the outer circumferential surface of the first master piston 14. Similarly, the sealing members 93, 94 are provided at the small diameter portion 113 and fluid-tightly contact the outer circumferential surface of the second master piston 15. Additionally, sealing members are provided between the input piston 13 and the cylinder portion 121.

The stroke sensor 72 is provided in the vicinity of the brake pedal 10. The stroke sensor 72 detects an amount of operation (an amount of pressing) applied to the brake pedal 10 and transmits the detection result to the brake ECU 6. The brake pedal 10 is connected to the rear end of the input piston 13. Consequently, the stroke sensor 72 detects the amount of movement of the input piston 13 in the axial direction (i.e. a position of the input piston 13 in the axial direction).

(The Reaction Force Generating Device 2)

The reaction force generating device 2 includes a stroke simulator 21. The stroke simulator 21 generates a reaction force pressure at the separation chamber 1B and the reaction force pressure chamber 1C in response to the operation of the brake pedal 10 and duplicates normal operation feeling (pressing feeling) of the brake system. Generally, the stroke simulator 21 is configured in such a manner that a piston 212 is fitted into a cylinder 211 while being allowed to slidably move therewithin and a pilot fluid chamber 214 is formed at a location forward of the piston 212, which is biased in the forward direction by a compression spring 213. The stroke simulator 21 is connected to the reaction force pressure chamber 10 via the conduit 164 and the port 11e, and is connected to the separation lock valve 22 and the reaction force valve 3 via the conduit 164.

(The Separation Lock Valve 22)

The separation lock valve 22 is a normally-closed-type electromagnetic valve (linear valve) and is configured so that opening and closing thereof is controlled by the brake ECU 6. The separation lock valve 22 is connected to the conduit 164 and the conduit 162, and is configured to connect/disconnect the conduit 162 with/from the conduit 164. The separation lock valve 22 is a valve for connecting/disconnecting the separation chamber 1B with/from the reaction force pressure chamber 1C. In other words, the separation lock valve 22 is the valve that is configured to open and close a connection between the conduits 162, 164, which connect the separation chamber 1B with the stroke simulator 21.

The pressure sensor 73 mainly detects pressure (the reaction force pressure) of the separation chamber 1B and the reaction force pressure chamber 1C. The pressure sensor 73 is connected to the conduit 164. The pressure sensor 73 detects the pressures of the separation chamber 1B and the reaction force pressure chamber 1C while the separation lock valve 22 is in an open state. On the other hand, while the separation lock valve 22 is in a closed state, the pressure sensor 73 detects the pressure at the reaction force pressure chamber 1C.

(The Reaction Force Valve 3)

The reaction force valve 3 is a normally-open-type electromagnetic valve and is configured so that opening and closing thereof is controlled by the brake ECU 6. The reaction force valve 3 is connected to the conduit 164 and the conduit 161, and is configured to connect/disconnect the conduit 161 with/from the conduit 164. The reaction force valve 3 is a valve which connects/disconnects the separation chamber 1B and the reaction force pressure chamber 1C with/from the reservoir 171.

(Controls of the Separation Lock Valve 22 and the Reaction Force Valve 3)

Explained below is a control executed by the brake ECU 6 in cooperation with the reaction force valve 3 and the separation lock valve 22 when the brake pedal 10 is operated. When the brake pedal 10 is pressed, the input piston 13 moves forward and the passage 18 is cut off, thereby interrupting the connection between the reservoir 171 and the separation chamber 1B. Simultaneously, the reaction force valve 3 is turned to be in a closed state (turned from an open state to the closed state), and the separation lock valve 22 is turned to be in the open state (turned from the closed state to the open state). While the reaction force valve 3 is in the closed state, the reaction force pressure chamber 1C is disconnected from the reservoir 171. While the separation lock valve 22 is in the open state, the separation chamber 1B is in the communication with the reaction force pressure chamber 1C. In other words, when the input piston 13 moves forward and the reaction force valve 3 is turned to be in the closed state, the separation chamber 1B and the reaction force pressure chamber 1C are disconnected from the reservoir 171. The same amount of fluid as inflow/outflow to/from the separation chamber 1B by the projection portion 142 in response to the movement of the master piston 14 flows into/out from the reaction force pressure chamber 1C. Then, the stroke simulator 21 generates the reaction force pressure corresponding to the stroke amount at the separation chamber 1B and the reaction force pressure chamber 1C. More specifically, the stroke simulator 21 applies the reaction force pressure corresponding to the stroke amount of the input piston 13 (the amount of operation applied to the brake pedal 10) to the brake pedal 10, which is connected to the input piston 13.

An area of an end surface of the projection portion 142 and an area of a surface of the servo pressure receiving portion 141a facing the reaction force pressure chamber 1C are equal to each other. Hence, while the reaction force valve 3 is in the closed state and while the separation lock valve 22 is in the open state, internal pressures at the separation chamber 1B and the reaction force pressure chamber 1C are equal to each other, therefore the force of the reaction force pressure of the separation chamber 1B acting on the end surface of the projection portion 142 becomes equal to the force of the reaction force pressure of the reaction force pressure chamber 1C acting on the surface facing the reaction force pressure chamber 1C. Hence, even when the driver presses the brake pedal 10 and the internal pressures of the separation chamber 1B and the reaction force pressure chamber 1C increase, the first master piston 14 does not move. Furthermore, because the area of the end surface of the projection portion 142 and the area of the surface of the servo pressure receiving portion 141a facing the reaction force pressure chamber 1C are formed to be equal to each other, the amount of fluid flowing into the stroke simulator 21 does not change even when the first master piston 14 moves. Accordingly, the reaction force pressure of the separation chamber 1B does not change and the reaction force transmitted to the brake pedal 10 also does not change.

In this embodiment, the area of the end surface of the projection portion 142 and a cross-sectional area of a portion where the input piston 13 penetrates the rear portion 121b of the cover cylinder 12 are formed to be equal to each other. Hence, in a case that the reaction force valve 3 is in the open state, the separation lock valve 22 is in the closed state and the separation chamber 1B is fluid-tight, the amount of movement of the input piston 13 and the amount of movement of the first master piston 14 become equal to each other.

(The Servo Pressure Generating Device 4)

The servo pressure generating device 4 mainly includes a pressure reducing valve 41 (which corresponds to a "pilot pressure generating device" of the present invention), a pressure increasing valve 42 (which corresponds to the "pilot pressure generating device" of the present invention), a pressure applying portion 43 (which corresponds to the "pilot pressure generating device" of the present invention), and a regulator 44. The pressure reducing valve 41 is a normally-open-type electromagnetic valve and is configured so that an opening area of a passage thereof is linearly controlled by the brake ECU 6 in order to control a hydraulic pressure at the downstream passage of the pressure reducing valve 41. One outlet/inlet of the pressure reducing valve 41 is connected to the conduit 161 via a conduit 411, and the other outlet/inlet of the pressure reducing valve 41 is connected to a conduit 413. More specifically, the one outlet/inlet of the pressure reducing valve 41 is in communication with the reservoir 171 via the conduits 411, 161, and ports 11a, 11b. The pressure increasing valve 42 is a normally-closed-type electromagnetic valve and is configured so that an opening area thereof is linearly controlled by the brake ECU 6, thereby controlling the hydraulic pressure at the downstream passage of the pressure increasing valve 42. One outlet/inlet of the pressure increasing valve 42 is connected to a conduit 421, and the other outlet/inlet of the pressure increasing valve 42 is connected to a conduit 422.

The pressure applying portion 43 is a means to supply the brake fluid at high pressure to the regulator 42 on the basis of a command from the brake ECU 6. The pressure applying portion 43 mainly includes an accumulator 431, a hydraulic pressure pump 432, a motor 433, and a reservoir 434.

The accumulator 431 pressure-accumulates the hydraulic pressure generated by the hydraulic pressure pump 432. The accumulator 431 is connected to the regulator 44, the pressure sensor 75 and the hydraulic pressure pump 432 via a conduit 431a. The hydraulic pressure pump 432 is connected to the motor 433 and the reservoir 434. The hydraulic pressure pump 432 supplies the brake fluid accumulated in the reservoir 434 to the accumulator 431 when the motor 433 is driven. The pressure sensor 75 detects the pressure of the accumulator 431, and the detected value corresponds to consumption of the brake fluid pressure-accumulated in the accumulator 431. In addition to the pressure of the accumulator 431, a servo pressure, which is increased by using the brake fluid of the accumulator 431, and the reaction force pressure, which increases in response to an increase of the servo pressure, correspond to the brake fluid consumption correlation value.

When the pressure sensor 75 detects that an accumulator pressure decreases to a value equal to or lower than a predetermined value, the motor 433 is driven on the basis of a control signal from the brake ECU 6, and the hydraulic pressure pump 432 supplies the brake fluid to the accumulator 431 in order to supply a pressure energy to the accumulator 431.

Figure 2:
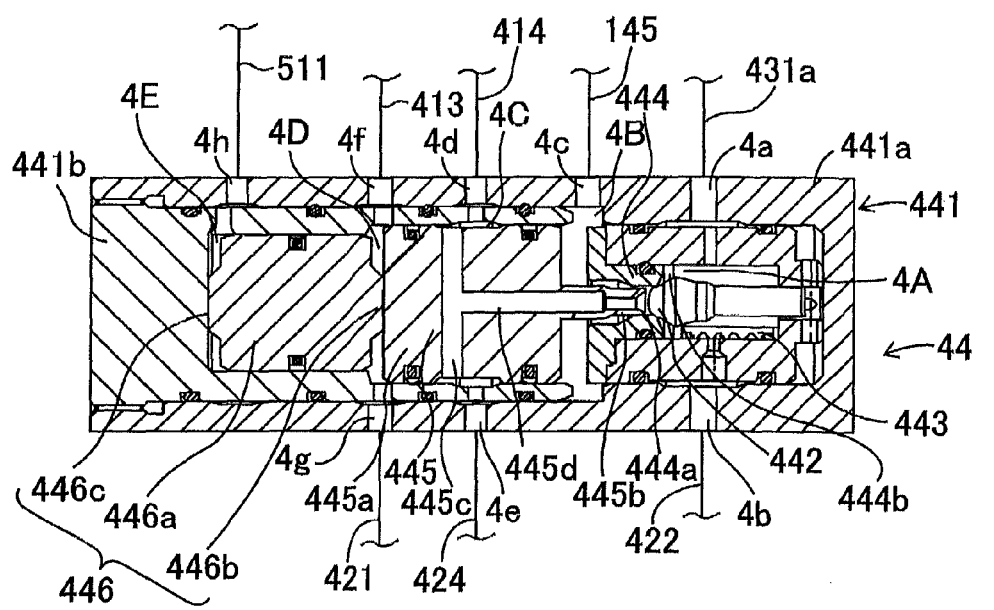
FIG. 2 is a cross sectional view illustrating a configuration of a regulator according to the embodiment.

As shown in FIG. 2, the regulator 44 is configured in such a manner that mainly a sub-piston 446 is added to a standard regulator. More specifically, the regulator 44 mainly includes a cylinder 441 (which corresponds to a "housing" of the present invention), a ball valve 442, a biasing portion 443, a valve seat portion 444, a control piston 445 (which corresponds to a "first valve body" of the present invention), and the sub-piston 446 (which corresponds to a "second valve body" of the present invention).

The cylinder 441 includes a cylinder case 441a formed in a substantially bottomed cylinder-shape having a bottom surface at one end thereof (a portion at the right side in FIG. 2), and a cover member 441b closing an opening of the cylinder case 441a (a portion at the left side thereof in FIG. 2). The cover member (441b) is formed to be substantially U-shaped in cross-section in FIG. 2. However, the regulator 44 is explained here with the cover member 441b as a column-shaped member, and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4b is connected to the conduit 422. The port 4c is connected to the conduit 163. The port 4d is connected to the conduit 161 via the conduit 411. The port 4e is connected to a conduit 424, which is connected to the conduit 422 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at an end portion thereof. The ball valve 442 is provided within the cylinder 441 at a location closer to the bottom surface of the cylinder case 441a (which will be hereinafter referred to also as a cylinder bottom surface side) while allowing the ball valve 442 to be slidably movable in a longitudinal direction of the cylinder case 441a. The biasing portion 443 is a spring member biasing the ball valve 442 towards the opening of the cylinder case 441a (which will be hereinafter referred to also as a cylinder opening side), and is provided at the bottom surface of the cylinder case 441a. The valve seat portion 444 is a wall member formed at an inner circumferential surface of the cylinder case 441a and divides the cylinder case into the cylinder opening side and the cylinder bottom surface side. A through passage 444a through which the divided cylinder opening side and the cylinder bottom surface side are in communication is formed at a center of the valve seat portion 444. A valve seat surface 444b, which is a surface formed in a frustoconical shape and to which the ball valve 442 contacts, is formed at an opening portion of the through passage 444a positioned closer to the cylinder base surface. The biased ball valve 442 contacts the valve seat surface 444b, so that the through passage 444a is closed by the ball valve 442.

A space defined by the ball valve 442, the biasing portion 443, the valve seat portion 444, and a portion of the inner circumferential surface of the cylinder case 441a positioned closer to the cylinder base surface is referred to as a first chamber 4A. The first chamber 4A is filled with the brake fluid. The first chamber 4A is connected to the conduit 431a via the port 4a and to the conduit 422 via the port 4b.

The control piston 445 includes a main body portion 445a formed in a substantially column shape and a projection portion 445b formed in a substantially column shape having a smaller diameter than the main body portion 445a. The main body portion 445a is provided inside the cylinder 441 in a coaxial and fluid-tight manner relative to the cylinder opening side of the valve seat portion 444, while allowing the main body portion 445a to be slidably movable in the axial direction. The main body portion 445a is biased towards the cylinder opening by means of a biasing member, which is not illustrated in FIG. 2. A passage 445c is formed at a substantially intermediate portion of the main body portion 445a in the cylinder axial direction. The passage 445c extends in the radial direction (in an up-and-down direction in FIG. 2) so that both end portions thereof open at a circumferential surface of the main body portion 445a. A portion of an inner circumferential surface of the cylinder 441 corresponding to the location of the opening of the passage 445c is provided with the port 4d and is formed to recess so as to form a third chamber 4C together with the main body portion 445a.

The projection portion 445b projects towards the cylinder base surface from a center portion of an end surface of the main body portion 445a facing the cylinder base surface. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axial direction and opens at a center portion of an end surface of the projection portion 445b facing the cylinder base surface. The passage 445d extends to the inside of the main body portion 445a and is connected to the passage 445c.

A space defined by the end surface of the main body portion 445a facing the cylinder bottom surface, an outer surface of the projection portion 445b, the inner circumferential surface of the cylinder 441, the valve seat portion 444, and the ball valve 442 is referred to as a second chamber 4B (which corresponds to a "servo pressure generating chamber" of the present invention). The second chamber 4B is in communication with the ports 4d, 4e via the passages 445c, 445d, and the third chamber 4C.

The sub-piston 446 includes a sub main body portion 446a, a first projection portion 446b, and a second projection portion 446c. The sub main body portion 446a is formed in a substantially column shape. The sub main body portion 446a is provided within the cylinder 441 in the coaxial and fluid-tight manner relative to the cylinder opening side of the main body portion 445a while allowing the sub main body portion 446a to be slidably movable in the axial direction.

The first projection portion 446b is formed in a substantially column shape having a smaller diameter than the sub main body portion 446a and projects from a center portion of an end surface of the sub main body portion 446a facing the cylinder base surface. The first projection portion 446b contacts an end surface of the main body portion 445a facing the cylinder opening. The second projection portion 446c is formed in the same shape as the first projection portion 446b. The second projection portion 446c projects from a center portion of an end surface of the sub main body portion 446a facing the cylinder opening. The second projection portion 446c contacts the cover member 441b.

A space defined by the end surface of the sub main body portion 446a facing the cylinder base surface, an outer surface of the first projection portion 446b, an end surface of the control piston 445 facing the cylinder opening, and the inner circumferential surface of the cylinder 441 is referred to as a pressure control chamber 4D (which corresponds to a "first pilot chamber" of the present invention). The pressure control chamber 4D is in communication with the pressure reducing valve 41 via the port 4f and the conduit 413, and with the pressure increasing valve 42 via the port 4g and the conduit 421.

A space defined by the end surface of the sub main body portion 446a facing the cylinder opening, an outer surface of the second projection portion 446c, the cover member 441b, and the inner circumferential surface of the cylinder 441 is referred to as a fourth chamber 4E (which corresponds to a "second pilot chamber" of the present invention). The fourth chamber 4E is in communication with the port 11g via the port 4h and the conduits 511, 51. Each of the chambers 4A through 4E is filled with the brake fluid. As illustrated in FIG. 1, the pressure sensor 74 is a sensor that detects the pressure (the servo pressure) of the servo chamber 1A, and is connected to the conduit 163. In this embodiment, a cross-sectional area S1 of the second chamber 4B (the servo pressure generating chamber) and a cross-sectional area S2 of the pressure control chamber 4D (the first pilot chamber) are formed to be equal to each other. A cross-sectional area S3 of the fourth chamber 4E (the second pilot chamber) is formed to be smaller than S1 and S2.

(A Brake Circuit)

The first master chamber 1D and the second master chamber 1E, at which a master cylinder pressure is generated, are in communication with the wheel cylinders WCfl, WCfr, WCrl, WCrr via the conduits 51, 52, and the ABS 53. More specifically, the known ABS (the Antilock Brake System) 53 is connected to the port 11g of the first master chamber 1D and the port 11i of the second master chamber 1E via the conduits 51, 52, respectively. The ABS 53 is connected to the wheel cylinders WCfl, WCfr, WCrl, WCrr, which activate the friction brake for braking the wheels Wfl, Wfr, Wrl, Wrr.

The ABS 53 is explained with a configuration of one of the four wheels (Wfr) as an example, and explanation about other wheels will be omitted because all four wheels are configured the same. The ABS 53 includes a pressure holding valve 531, a pressure reducing valve 532, a reservoir 533, a pump 534, and a motor 535. The pressure holding valve 531 is a normally-open-type electromagnetic valve and is configured so that opening and closing thereof is controlled by the brake ECU 6. The pressure holding valve 531 is arranged so that one side is connected to the conduit 52 and the other side is connected to the wheel cylinder WCfr and the pressure reducing valve 532. In other words, the pressure holding valve 531 functions as an input valve of the ABS 53.

The pressure reducing valve 532 is a normally-closed-type electromagnetic valve and is configured so that opening and closing thereof is controlled by the brake ECU 6. The pressure reducing valve 532 is arranged so that one side is connected to the wheel cylinder WCfr and the pressure holding valve 531 and the other side is connected to the reservoir 533. The wheel cylinder WCfr and the reservoir 533 are in communication while the pressure reducing valve 532 is in the open state.

The reservoir 533 stores the brake fluid and is connected to the conduit 52 via the pressure reducing valve 532 and the pump 534. The pump 534 is arranged so that an inlet thereof is connected to the reservoir 533 and an outlet is connected to the conduit 52 via a check valve Z. The check valve Z, through which the outlet of the pump 532 is connected to the conduit 52, allows the brake fluid to flow from the pump 534 to the conduit 52 (the second master chamber 1E) but does not allow the brake fluid to flow in the reverse direction. The pump 534 is driven in response to an activation of the motor 535 in accordance with the command from the ECU 6. The pump 534 sucks in the brake fluid within the wheel cylinder WCfr or the brake fluid stored in the reservoir 533 and returns the brake fluid to the second master chamber 1E when a pressure reduction mode of an ABS control is executed. Additionally, a damper (not illustrated) is provided at an upstream of the pump 534 in order to reduce pulsation of the brake fluid discharged from the pump 534.

The ABS 53 includes a wheel speed sensor (not illustrated) that detects a wheel speed. The wheel speed sensor is configured so that a detection signal indicative of the wheel speed detected by the wheel speed sensor (not illustrated) is outputted to the brake ECU 6.

According to the ABS 53 having the above-described configuration, the brake ECU 6 controls switching of the opening/closing of each of the electromagnetic valves 531, 532 on the basis of the master cylinder pressure, the state of the wheel speed, and a vertical acceleration, and activates the motor 535 if necessary in order to execute the ABS control (the Antilock Brake Control) that adjusts the brake hydraulic pressure applied to the wheel cylinder WCfr, i.e. the braking force applied to the wheel Wfr. The ABS 53 is a device that adjusts the amount, the timing and the like of the brake fluid supplied from the master cylinder 1 (i.e. the ABS 53 adjusts the master pressure) on the basis of the command from the brake ECU 6 and supplies the adjusted brake fluid to the wheel cylinders WCfl, WCfr, WCrl, WCrr.

In a "linear mode", which will be explained in detail below, the hydraulic pressure transmitted from the accumulator 431 of the servo pressure generating device 4 is controlled by the pressure increasing valve 42 and the pressure reducing valve 41, and the servo pressure is generated at the servo chamber 1A, thereby the first master piston 14 and the second master piston 15 move forward and the first master chamber 1D and the second master chamber 1E are pressurized. The hydraulic pressures at the first master chamber 1D and the second master chamber 1E are applied to the wheel cylinders WCfl, WCfr, WCrl, WCrr as the master cylinder pressure from the ports 11g, 11i via the conduits 51, 52 and the ABS 53, and a hydraulic pressure braking force is applied to the wheels Wfl, Wfr, Wrl, Wrr.

(The Brake ECU 6)

The brake ECU 6 is an electronic control unit and includes a microcomputer. The microcomputer includes an input/output interface, a CPU, a RAM, a ROM, and a memory portion including such as a nonvolatile memory and the like, which are connected with one another via a bus. The CPU executes programs, which are described in detail in the flowcharts shown in FIGS. 3, 8 and 9. The RAM temporarily stores variables necessary for executing the programs. The memory portion stores for example the above-mentioned programs that execute the flowcharts shown in FIGS. 3, 8 and 9, and a mapping data shown in FIG. 5.

The brake ECU 6 communicates with each of the sensors 72 to 75 and controls each of the electromagnetic valves 22, 3, 41, 42, 531, 532, each of the motors 433, 535 and the like. Furthermore, the brake ECU 6 is connected to a hybrid ECU (not illustrated) so as to communicate with each other, and executes a cooperative control (a regenerative cooperative control) so that a required braking force becomes equal to the sum of the target regenerative braking force generated by the regenerative brake system and the target friction braking force generated by the friction brake system B. The brake ECU 6 memorizes two control modes, the "linear mode" and a "REG mode".

The "linear mode" is, as described in detail below, a normal brake control. More specifically, the linear mode is a mode to control the "servo pressure" of the servo chamber 1A in such a manner that the pressure reducing valve 41 and the pressure increasing valve 42 are controlled while the separation lock valve 22 is opened and the reaction force valve 3 is closed. In the "linear mode", the brake ECU 6 estimates the "required braking force" required by the driver on the basis of the amount of operation of the brake pedal 10 (i.e. the amount of movement of the input piston 13) detected by the stroke sensor 72. Then, the brake ECU 6 outputs the "required braking force" required by the driver to the hybrid ECU and obtains a target value of the regenerative brake system, i.e. the "target regenerative braking force" from the hybrid ECU, then the brake ECU 6 subtracts the "target regenerative braking force" from the "required braking force" in order to obtain the "target friction braking force". The brake ECU 6 then controls the pressure reducing valve 41 and the pressure increasing valve 42 on the basis of the calculated "target friction braking force" in order to control the "servo pressure" of the servo chamber 1A, thereby controlling the friction braking force generated at the friction brake system B to correspond to the "target friction braking force". In other words, the "required braking force" is calculated on the basis of the amount of movement of the input piston 13, but because the "target friction braking force" varies depending on the magnitude of the "target regenerative braking force", the first master piston 14 does not always move in response to the movement of the input piston 13. Additionally, in a case that the "required braking force" does not change but the "target regenerative braking force" increases, the "friction braking force" decreases by the increase of the "target regenerative braking force", consequently the first master piston 14 moves closer to the input piston 13 by a distance corresponding to the decrease of the "friction braking force" (i.e. the increase of the "target regenerative braking force").

The "REG mode" is, as described in detail below, a mode to turn the pressure reducing valve 41, the pressure increasing valve 42, the separation lock valve 22 and the reaction force valve 3 to be in a non-energized state, or a mode to be executed in a case that the pressure reducing valve 41, the pressure increasing valve 42, the separation lock valve 22 and the reaction force valve 3 are turned to be in the non-energized state (maintaining a normal state) because of a failure and the like.

(The Linear Mode)

While the brake pedal 10 is not pressed, the above-described state is established, i.e. the ball valve 442 closes the through passage 444a of the valve seat portion 444. In this case, the pressure reducing valve 41 is in the open state, and the pressure increasing valve 42 is in the closed state. Consequently, the first chamber 4A and the second chamber 4B are disconnected from each other.

The second chamber 4B is in communication with the servo chamber 1A via the conduit 163, and the pressure at the second chamber 4B and the pressure at the servo chamber 1A are maintained to be equal to each other. The second chamber 4B is in communication with the third chamber 4C via the passages 445c, 445d of the control piston 445. Accordingly, the second chamber 4B and the third chamber 4C are in communication with the reservoir 171 via the conduits 414, 161. The pressure control chamber 4D is formed so that one thereof is closed by the pressure increasing valve 42 and the other is in communication with the reservoir 171 via the pressure reducing valve 41. The pressure at the pressure control chamber 4D and the pressure at the second chamber 4B are maintained to be equal to each other. The fourth chamber 4E is in communication with the first master chamber 1D via the conduits 511, 51, and the pressure at the fourth chamber 4E and the pressure at the first master chamber 1D are maintained to be equal to each other.

When the brake pedal 10 is pressed while the above-described state is maintained, the brake ECU 6 controls the pressure reducing valve 41 and the pressure increasing valve 42 on the basis of the target friction braking force. More specifically, the brake ECU 6 controls the pressure reducing valve 41 in a valve-closing direction and the pressure increasing valve 42 in a valve-opening direction.

When the pressure increasing valve 42 opens, the communication between the accumulator 431 and the pressure control chamber 4D is established. When the pressure reducing valve 41 is closed, the pressure control chamber 4D is disconnected from the reservoir 171. The pressure of the pressure control chamber 4D may be increased by the high pressure brake fluid supplied thereto from the accumulator 431. The control piston 445 slide-moves towards the cylinder base surface in response to the increase of the pressure in the pressure control chamber 4D. Accordingly, the end portion of the projection portion 445b formed at the control piston 445 contacts the ball valve 442, and the passage 445d is closed by the ball valve 442. As a result, the second chamber 4B is disconnected from the reservoir 171.

Furthermore, the ball valve 442 is pushed by the projection portion 445b and moves towards the cylinder base surface in response to the sliding movement of the control piston 445 towards the cylinder base surface, and the ball valve 442 is spaced away from the valve seat surface 444b. Accordingly, the communication between the first chamber 4A and the second chamber 4B is established via the through passage 444a of the valve seat portion 444. The high pressure brake fluid is supplied to the first chamber 4A from the accumulator 431, and the pressure of the second chamber 4B increases due to the establishment of the communication. Additionally, as the distance between the ball valve 422 and the valve seat surface 444b increases, the passage through which the brake fluid flows also increases, so that the hydraulic pressure at the downstream passage of the ball valve 442 increases accordingly. More specifically, as the pressure (the pilot pressure) of the pressure control chamber 4D increases, the moving distance of the control piston 445 also increases, and the distance between the ball vale 442 and the valve seat surface 444b increases, so that the hydraulic pressure (the servo pressure) of the second chamber 4B increases accordingly. The brake ECU 6 controls the pressure reducing valve 41 to decrease the downstream passage thereof and the pressure increasing valve 42 to increase the downstream passage thereof so that the greater the amount of movement of the input piston 13 detected by the stroke sensor (i.e. the operation amount of the brake pedal 10) becomes, the greater the pilot pressure of the pressure control chamber 4D becomes. In other words, as the amount of movement of the input piston 13 (i.e. the operation amount of the brake pedal 10) increases, the pilot pressure also increases, accordingly the servo pressure increases.

The pressure at the servo chamber 1A, which is in communication with the second chamber 4B, increases in response to the increase of the pressure at the second chamber 4B. As the pressure at the servo chamber 1A increases, the first master piston 14 moves forward and the pressure at the first master chamber 1D increases. Then, the second master piston 15 also moves forward and the pressure at the second master chamber 1E increases. As the pressure at the first master chamber 1D increases, the high pressure brake fluid is supplied to the below-mentioned ABS 53 and the fourth chamber 4E. Although the pressure at the fourth chamber 4E increases, the sub-piston 446 does not move because the pressure at the pressure control chamber 4D also increases. Accordingly, the high pressure brake fluid (the master cylinder pressure) is supplied to the ABS 53, and the friction brake is activated thereby braking the vehicle. The force that forwardly moves the first master piston 14 in the "linear mode" is comparable to the force corresponding to the servo pressure.

On the other hand, in order to cancel the brake operation, the pressure decreasing valve 41 is turned to be in the open state and the pressure increasing valve 42 is turned to be in the closed state, thereby connecting the reservoir 171 with the pressure control chamber 4D. Accordingly, the control piston 445 moves rearward and is returned to a state established before the brake pedal 10 is pressed.

(The REG Mode)

In the "REG mode", the pressure reducing valve 41, the pressure increasing valve 42, the separation lock valve 22 and the reaction force valve 3 are not energized (not controlled), therefore the pressure reducing valve 41 is in the open state, the pressure increasing valve 42 is in the closed state, the separation lock valve 22 is in the closed state, and the reaction force valve 3 is in the open state. Even after the brake pedal 10 is pressed, the non-energized state (the non-controlled state) of the pressure reducing valve 41, the pressure increasing valve 42, the separation lock valve 22, and the reaction force valve 3 is maintained.

When the brake pedal 10 is pressed while the "REG mode" is activated, the input piston 13 moves forward, and the passage 18 is cut off, so that the separation chamber 1B is disconnected from the reservoir 171. In this state, because the separation lock valve 22 is in the closed state, the separation chamber 1B is turned to be in a tightly closed state (a fluid-tight state). However, the reaction force pressure chamber 10 is in communication with the reservoir 171 because the reaction force valve 3 is in the open state.

When the brake pedal 10 is further pressed while the above-mentioned state is established, the input piston 13 moves forward and the pressure of the separation chamber 1B increases, thereby moving the first master piston 14 forward due to the increased pressure at the separation chamber 1B. In this case, because the pressure reducing valve 41 and the pressure increasing valve 42 are not energized, the servo pressure is not controlled. More specifically, the first master piston 14 moves forward only by the force (the pressure of the separation chamber 1B) corresponding to the operating force applied to the brake pedal 10. Accordingly, although a volume of the servo chamber 1A increases, the brake fluid is supplied because the servo chamber 1A is in communication with the reservoir 171 via the regulator 44.

As the first master piston 14 moves forward, the pressures at the first master chamber 1D and the second master chamber 1E increase as is the case with the "linear mode". The pressure at the fourth chamber 4E also increases in response to the increase of the pressure at the first master chamber 1D. The sub-piston 446 slidably moves towards the cylinder base surface in response to the increase of the pressure of the fourth chamber 4E. Simultaneously, the control piston 445 is pressed by the first projection portion 446b and slidably moves towards the cylinder base surface. Accordingly, the projection portion 445b contacts the ball valve 442, and the ball valve 442 is pressed by the projection portion 445b thereby moving towards the cylinder base surface. More specifically, the communication between the first chamber 4A and the second chamber 4B is established, the servo chamber 1A is disconnected from the reservoir 171, and the high pressure brake fluid is supplied to the servo chamber 1A by the accumulator 431.

Accordingly, when the brake pedal 10 is pressed by a predetermined stroke due to the operating force applied thereto, the communication between the accumulator 431 and the servo chamber 1A is established, and the servo pressure increases without any control in the "REG mode". Then, the first master piston 14 moves forward more than the first master piston 14 to be moved forward in response to the operating force applied by the driver. Accordingly, even when each electromagnetic valve is not energized, the high pressure brake fluid is supplied to the ABS 53.

The force that forwardly moves the first master piston 14 in the "REG mode" is comparable to the force corresponding to the operating force. In other words, the force corresponding to the operating force refers to the force that forwardly moves the first master piston 14 only by the operating force, and the force that forwardly moves the first master piston 14 by the servo pressure, which is mechanically generated on the basis of the operation.

(A First Process of Estimating a Contact of the First Input Piston)

The "first process of estimating the contact of the input piston" is described below with reference to the flowchart shown in FIG. 3. When the vehicle is in a startable state and the brake ECU 6 is activated, the brake ECU 6 obtains an amount of movement Di of the input piston 13 from the stroke sensor 72 and a reaction force pressure Pa of each of the separation chamber 1B and the reaction force pressure chamber 1C from the pressure sensor 73 in S11, and the brake ECU 6 proceeds the program to S12.

In S12, the brake ECU 6 calculates the "required braking force" in such a manner that the brake ECU 6 looks up the amount of movement Di and the reaction force pressure Pa in a mapping data defining a relationship between the amount of movement Di and the reaction force pressure Pa on the one hand and the "required braking force" on the other. Then, the brake ECU 6 outputs the "required braking force" to the hybrid ECU, obtains the target value of the regenerative brake system, i.e. the "target regenerative braking force" from the hybrid ECU, and subtracts the "target regenerative braking force" from the "required braking force", thereby obtaining the "target friction braking force". The brake ECU 6 advances the program to S13.

In S13, the brake ECU 6 calculates a required wheel cylinder pressure Ph applied to the wheel cylinders WCfl, WCfr, WCrl, WCrr from the "target friction braking force", and the brake ECU advances the program to S14.

Figure 4A:
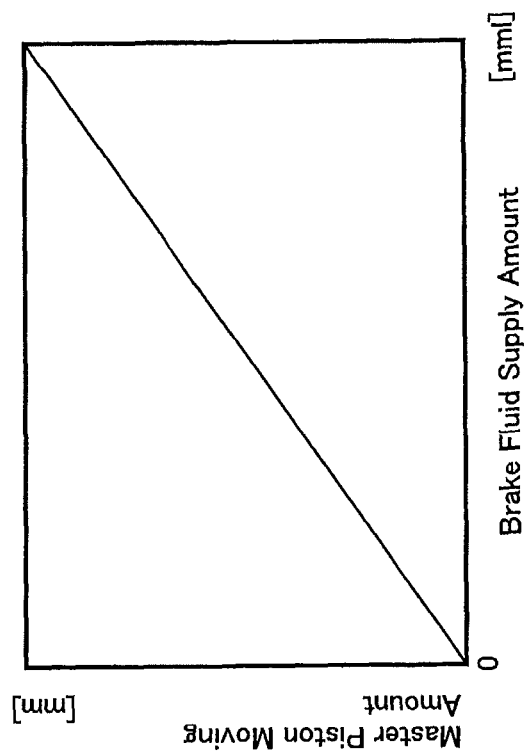
FIG. 4A is a mapping data showing a relationship between a required wheel cylinder pressure and a brake fluid supply amount.

In S14, the brake ECU 6 looks up the required wheel cylinder pressure Ph in a mapping data shown in FIG. 4A and defining a relationship between the required wheel cylinder pressure and a brake fluid supply amount in order to obtain the required brake fluid supply amount Fq. As shown in FIG. 4A, as the required wheel cylinder pressure increases, the brake fluid supply amount also increases. After the S14 is completed, the program proceeds to S15.

Figure 4B:
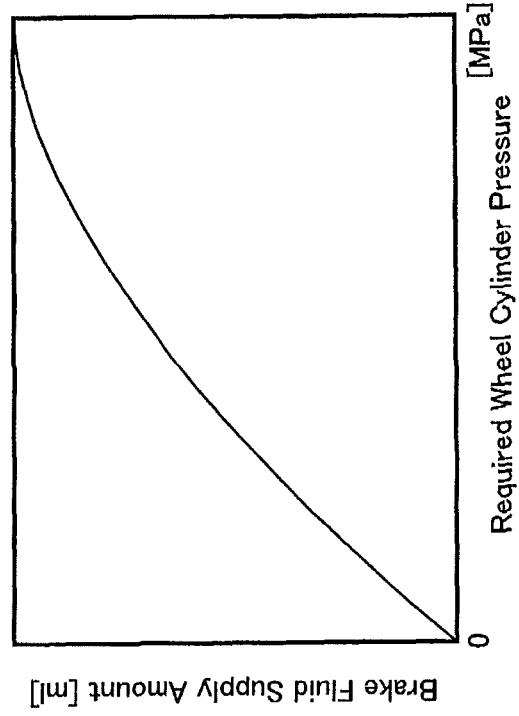
FIG. 4B is a mapping data showing a relationship between the brake fluid supply amount and an amount of movement of a master piston.

In S15, the brake ECU 6 looks up the required brake fluid supply amount Fq in a mapping data shown in FIG. 4B and defining a relationship between the required brake fluid supply amount and the amount of movement of the first master piston 14 in order to obtain an amount of movement Dm of the first master piston 14. As shown in FIG. 4B, the amount of movement of the first master piston 14 increases in proportion to an increase of the required brake fluid supply amount. After the S15 is completed, the program advances to S16.

In S16, the brake ECU 6 calculates a distance Ds between the first master piston 14 and the input piston 13 from the amount of movement Di of the input piston 13 and the amount of movement Dm of the first master piston 14, which are obtained in the above-mentioned manner. More specifically, the brake ECU 6 calculates the distance Ds between the first master piston 14 and the input piston 13 in such a manner that the amount of movement Di of the input piston 13 and the amount of movement Dm of the first master piston 14 are substituted in the following equation (1).

$$Ds = Dp - Di + Dm \quad (1)$$

where Ds: the distance (mm) between the first master piston 14 and the input piston 13, Dp: an initial distance (mm) between the first master piston 14 and the input piston 13, Di: the amount of movement (mm) of the input piston 13, and Dm: the amount of movement (mm) of the first master piston 14.

The initial distance Dp is the distance between the first master piston 14 and the input piston 13 while the brake pedal 10 is not pressed. After S16 is completed, the program proceeds to S17.

In S17, the brake ECU 6 estimates whether or not the first master piston 14 and the input piston 13 contact with one another on the basis of the distance Ds between the first master piston 14 and the input piston 13. The brake ECU 6 determines the first master piston 14 and the input piston 13 are in a separated state in an initial determination. From the next determination, the brake ECU 6 determines the contact between the first master piston 14 and the input piston 13 on the basis of separation threshold (i.e. a threshold for the separated state) and a contact threshold (i.e. a threshold for the contact state), which are different determination thresholds, depending on whether the previous determined state is the separated state or the contact state. More specifically, in the case that the previous determination concludes the separated state, the brake ECU 6 concludes that the separated state is maintained when the brake ECU 6 determines that the distance Ds is greater than the separation threshold 0 mm, and the brake ECU 6 concludes that the first master piston 14 and the input piston 13 are in the contact state when the distance Ds is equal to or lower than the separation threshold 0 mm. On the other hand, in the case that the previous determination concludes the contact state, the brake ECU 6 concludes that the contact state is maintained when the brake ECU 6 determines that the distance Ds is lower than the contact threshold 2 mm, and the brake ECU 6 concludes that the first master piston 14 and the input piston 13 are in the separated state when the distance Ds is equal to and greater than the contact threshold 2 mm. After S17 is completed, the program proceeds to S11.

(A Second Process of Estimating the Contact of the Input Piston)

The "second process of estimating the contact of the input piston" is described below with reference to the graph shown in FIG. 5. Firstly, the graph in FIG. 5 is explained here. The graph in FIG. 5 shows a relationship between the reaction force pressure Pa detected by the pressure sensor 73 and a servo pressure Ps detected by the pressure sensor 74. A separation estimation reference line, a contact estimation 50% reference line, a return-side contact estimation 50% reference line, and a contact estimation 100% reference line, which are mapping data similar to a static characteristic line, are set in the graph in FIG. 5 as described below. A horizontal axis represents the reaction force pressure, and a vertical axis represents the servo pressure.

A solid line in FIG. 5 represents the static characteristic line. The static characteristic line is a characteristic line representing a relationship between the reaction force pressure Pa and the servo pressure Ps when the driver slowly presses the brake pedal 10. The static characteristic line shows that as the reaction force pressure Pa increases, the servo pressure Ps also increases. At an early stage of the increase of the reaction force pressure Pa, the servo pressure Ps greatly increases relative to the increase of the reaction force pressure Pa. However, while the reaction force pressure Pa is already increased to some extent, the servo pressure Ps slowly increases relative to the increase of the reaction force pressure Pa when compared to the early stage of the increase of the reaction force pressure Pa. When the driver slowly presses the brake pedal 10, the servo pressure Ps increases so as to follow the increase of the reaction force pressure Pa at the early stage of the increase of the reaction force pressure Pa as indicated by the static characteristic line in FIG. 5.

A dotted line in FIG. 5 represents a sudden pressing characteristic line. The sudden pressing characteristic line represents a relationship between the reaction force pressure Pa and the servo pressure Ps when the driver presses the brake pedal 10 suddenly and hard in order to activate the brake in an emergency situation and the like (which will be hereinafter referred to as a sudden pressing). When the driver suddenly presses the brake pedal 10, the input piston 13 suddenly moves in the forward direction, the pressures of the separation chamber 1B and the reaction force pressure chamber 1C suddenly increase by the stroke simulator 21, and the reaction force pressure Pa suddenly increases.

On the other hand, the servo pressure when the driver suddenly presses the brake pedal 10 does not follow the increase of the reaction force pressure Pa. The reasons for this are explained below one by one. The brake ECU 6 controls the pressure reducing valve 41 and the pressure increasing valve 42 on the basis of the amount of movement of the input piston 13 detected by the stroke sensor 72 and generates the pilot pressure, then the servo pressure is generated by the generated pilot pressure. More specifically, the pressure reducing valve 41 is controlled in the valve-closing direction and the pressure increasing valve 42 is controlled in the valve-opening direction, thereby generating the pilot pressure. The control piston 445 is moved by the generated pilot pressure, so that the high pressure brake fluid is supplied from the accumulator 431, thereby the servo pressure is generated. The generation of the servo pressure may delay in response while generating the servo pressure in the above-described manner because of a response lag of the pressure reducing valve 41 and the pressure increasing valve 42, a response lag of the control piston 445 to move due to a slide resistance generated by the sealing member and the like. Therefore, the servo pressure Ps does not follow the increase of the reaction force pressure Pa at the early stage of the increase of the reaction force pressure Pa. When the control piston 445 moves and the servo pressure Ps is generated, the servo pressure Ps suddenly increases. Even in the case that the driver suddenly presses the brake pedal 10, the servo pressure Ps increases similarly as represented by the static characteristic line after the servo pressure Ps increases to some extent.

The increase of the reaction force pressure Pa indicates the movement of the input piston 13, and the increase of the servo pressure Ps indicates the movement of the first master piston 14. In the case that the servo pressure Ps follows the increase of the reaction force pressure Pa, the first master piston 14 moves in response to the movement of the input piston 13. On the other hand, in the case that the servo pressure Ps does not follow the increase of the reaction force pressure Pa, the input piston 13 moves closer to the first master piston 14 because the first master piston 14 does not move in response to the movement of the input piston 13.

On the basis of the above-mentioned knowledge, the inventors of the present invention appropriately set the separation estimation reference line, the contact estimation 50% reference line, the return-side contact estimation 50% reference line, and the contact estimation 100% reference line so as to be offset towards the higher reaction force pressure relative to the static characteristic line as shown by dot-dash lines in FIG. 5 in this order from the lower reaction force pressure to the higher reaction force pressure, and the inventors estimate whether or not the first master piston 14 contacts the input piston 13 on the basis of the reference lines. More specifically, detecting that the relationship between the reaction force pressure Pa and the servo pressure Ps moves away from the static characteristic line in a direction where the reaction force pressure increases allows the state in which the increase of the servo pressure Ps does not follow the increase of the reaction force pressure Pa to be detected. Hence, an approach of the input piston 13 towards the first master piston 14, and consequently, the contact between the input piston 13 and the first master piston 14 may be estimated.

The contact estimation 50% reference line is a reference line for estimating the contact between the input piston 13 and the first master piston 14, which are in the separated state, with 50% probability. In a case that the brake ECU 6 determines that the relationship between the reaction force pressure Pa and the servo pressure Ps moves from the left to the right (towards the direction where the reaction force pressure increases) relative to the contact estimation 50% reference line (see (1) in FIG. 5), the brake ECU 6 estimates that the input piston 13 contacts the first master piston 14, which are in the separated state, with 50% probability.

The contact estimation 100% reference line is a reference line for estimating whether or not the input piston 13 and the first master piston 14 contact with one another with 100% probability. In a case that the brake ECU 6 determines that the relationship between the reaction force pressure Pa and the servo pressure Ps moves from the left to the right (in the direction in which the reaction force pressure increase) relative to the contact estimation 100% reference line (see (2) in FIG. 5), the brake ECU 6 estimates that the input piston 13 and the first master piston 14 contact with one another with 100% probability.

The return-side contact estimation 50% reference line is a reference line for estimating whether or not the input piston 13 and the first master piston 14, which were estimated to contact with one another with 100% probability, contact with each other with 50% probability. In a case that the brake ECU 6 determines that the relationship between the reaction force pressure Pa and the servo pressure Ps moves from the right to the left (in the direction where the reaction force pressure decreases) relative to the contact estimation 50% reference line (see (3) in FIG. 5), the brake ECU 6 estimates that the input piston 13 and the first master piston 14, which were estimated to contact with one another with 100% probability, contact with each other with 50% probability.

The separation estimation reference line is a reference line for estimating whether or not the input piston 13 and the first master piston 14 are spaced apart from each other. In a case that the brake ECU 6 determines that the relationship between the reaction force pressure Pa and the servo pressure Ps moves from the right to the left (in the direction where the reaction force pressure decreases) relative to the contact estimation 50% reference line (see (4) in FIG. 5), the brake ECU 6 estimates the first master piston 14 and the input piston 13, which were estimated to contact with one another with 50% probability, are spaced apart from each other.

As is evident from the above explanation, the inventors of the present invention found out that the amount of movement of the first master piston 14 is calculable from the amount of movement of the input piston 13 as a result of studies and research about the friction brake system B (the vehicle brake system) carried out by the inventors. More specifically, the servo pressure is generated on the basis of the amount of movement of the input piston 13, the generated servo pressure acts on the servo chamber 1A, thereby the master pistons 14, 15 move and the brake fluid is supplied to the wheel cylinders WCfl, WCfr, WCrl, WCrr from the master chambers 1D, 1E. Therefore, the supply amount of the brake fluid to the wheel cylinders WCfl, WCfr, WCrl, WCrr from the master chambers 1D, 1E is calculable from the amount of movement of the input piston 13.

Figure 3:
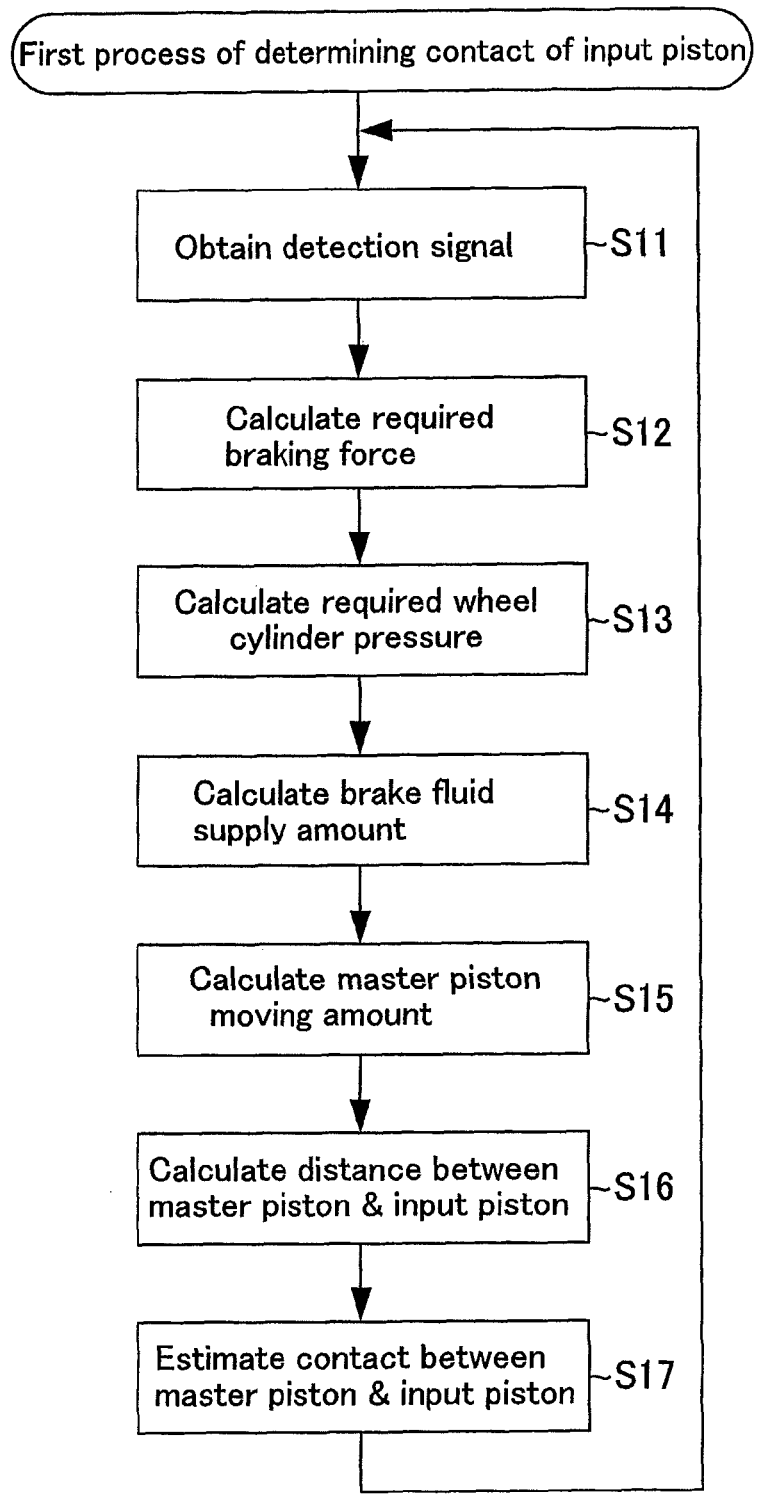
FIG. 3 is a flowchart of a first process for estimating a contact of an input piston, which is a control program executed by a brake ECU illustrated in FIG. 1.

Accordingly, as shown in the above-described processes executed in S11 to S15 in FIG. 3, the brake ECU 6 (a master piston moving amount calculating portion) calculates the amount of movement of the first master piston 14 on the basis of the amount of movement of the input piston 13, and the brake ECU 6 is capable of estimating the contact between the first master piston 14 (the projection portion 142) and the input piston 13 on the basis of the amount of movement of the first master piston 14 and the amount of movement of the input piston 13. Hence, the contact of the input piston 13 with the first master piston 14 is estimable without providing an additional sensor.

Furthermore, the inventors of the present invention acquired knowledge that the servo pressure does not follow the increase of the reaction force pressure as illustrated in FIG. 5 when the driver pressed the brake pedal 10 hard and suddenly as a result of studies and research about the friction brake system B (the vehicle brake system) carried out by the inventors. More specifically, the reaction force pressure of the reaction force chamber 1B, to which the input piston 13 faces, suddenly increases in response to the movement of the input piston 13, however, the servo pressure at the servo pressure generating device 4 (the servo pressure generating portion), which generates the servo pressured upon detection of the movement of the input piston 13, increases with delay in response, and the servo pressure does not follow the increase of the reaction force pressure. The increase of the reaction force pressure indicates the movement of the input piston 13, and the increase of the servo pressure indicates the movement of the master piston 14. However, in the case that the servo pressure does not follow the increase of the reaction force pressure, the first master piston 14 does not move in response to the movement of the input piston 13, therefore the input piston 13 moves closer to the first master piston 14.

Accordingly, as shown in the above-described FIG. 5, the brake ECU 6 (a contact estimating portion) is capable of estimating the approach of the input piston 13 to the first master piston 14 and, consequently, the contact therebetween on the basis of the reaction force pressure and the servo pressure. Accordingly, the contact of the input piston 13 with the first master piston 14 is estimable without providing an additional sensor.

Furthermore, in the process executed in the above-described S17 in FIG. 3, a reference (in the above-described embodiment, the distance of 2 mm) by which the input piston 13 and the first master piston 14, which were estimated to be in the contact state, are estimated to be spaced apart from each other by the brake ECU 6 (the contact estimating portion) is set to have a greater value than a reference (in the above-described embodiment, the distance of 0 mm) by which the input piston 13 and the first master piston 14, which were estimated to be in the separated state, are estimated to contact with one another. As a result, repetitive estimations of the contact and separation between the input piston 13 and the first master piston 14 (i.e. chattering) after the input piston 13 contacts the first master piston 14 may be avoided.

Furthermore, as shown in FIG. 5, the reference (the separation estimation reference line shown in FIG. 5) by which the input piston 13 and the first master piston 14, which were estimated to be in the contact state, are estimated to be spaced apart by the ECU 6 (the contact estimating portion) is set towards the smaller reaction force pressure (towards the separation) relative to the reference (the contact 100% reference line in FIG. 5) by which the input piston 13 and the first master piston 14, which were estimated to be in the separated state, are estimated to contact with each other. Accordingly, the repetitive estimations of the contact and separation between the input piston 13 and the first master piston 14 (i.e. the chattering) after the input piston 13 contacts the first master piston 14 may be avoided.

In the above-explained embodiment, the brake ECU 6 calculates the "target braking force" in S12 shown in FIG. 3 on the basis of the amount of movement Di of the input piston 13 and the reaction force pressure Pa, and then the brake ECU 6 calculates the "target friction braking force". Alternatively, the brake ECU 6 may be configured so that the brake ECU 6 calculates the "required braking force" on the basis only of the amount of movement Di of the input piston 13, and then the brake ECU 6 calculates the "target friction braking force".

In processes executed in S13 through S15 in FIG. 3, the brake ECU 6 calculates the required wheel cylinder pressure Ph from the "target friction braking force", then the brake ECU 6 calculates the brake fluid supply amount Fq from the required wheel cylinder pressure Ph, and further, the brake ECU 6 calculates the amount of movement Dm of the first master piston 14 from the brake fluid supply amount Fq. Alternatively, the brake ECU 6 may be configured to look up the "target friction braking force" in a mapping data defining a relationship between the friction braking force and the amount of movement Dm of the first master piston 14 thereby directly obtaining the amount of movement Dm of the first master piston 14. Alternatively, the brake ECU 6 may be configured to calculate the required wheel cylinder pressure Ph on the basis of the "target friction braking force" and look up the obtained required wheel cylinder pressure Ph in a mapping data defining the relationship between the required wheel cylinder pressure Ph and the amount of movement Dm of the first master piston 14, thereby obtaining the amount of movement Dm of the first master piston 14.

In S17 shown in FIG. 3, the brake ECU 6 determines that the input piston 13 contacts the first master piston 14 in the case that the distance Ds between the first master piston 14 and the input piston 13 is 0 mm. Alternatively, the brake ECU 6 may be configured to determine that the input piston 13 contacts the first master piston 14 in a case that the distance Ds between the first master piston 14 and the input piston 13 is equal to or lower than a predetermined distance (e.g. equal to or lower than 0.1 mm). The brake ECU 6 determines that the input piston 13 and the first master piston 14 (the projection portion 142) are spaced apart from each other in the case that the distance Ds is greater than 2 mm. Alternatively, the brake ECU 6 may be configured to estimate that the input piston 13 and the first master piston 14 (the projection portion 142) are spaced apart from each other in a case that the distance Ds is greater than 0 mm and then the distance Ds becomes equal to or greater than a predetermined distance (e.g. 0.5 mm).

(The Estimation of the Master Pressure)

In the linear mode, when a front end surface of the input piston 13 of the master cylinder 1 contacts the rear end surface of the projection portion 142 of the first master piston 14, the force that presses the first master piston 14 is reduced by a force equivalent to the force which is applied from the separation chamber 1B and which is generated by a pressure at a contact area between the front end surface of the input piston 13 and the rear end surface of the projection portion 142. However, the force that presses the first master piston 14 is increased by the force applied from the input piston 13, i.e. the pressing force applied to the brake pedal 10. Accordingly, an actual master pressure at the first master chamber 1D (the second master chamber 1E) changes by a difference between the above-mentioned increase and decrease, which may result in generating a gap between the actual maser pressure the target master pressure and the performance of the brake control such as the ABS (the antilock brake system) and the like executed on the basis of the master pressure may be deteriorated.

Figure 6:
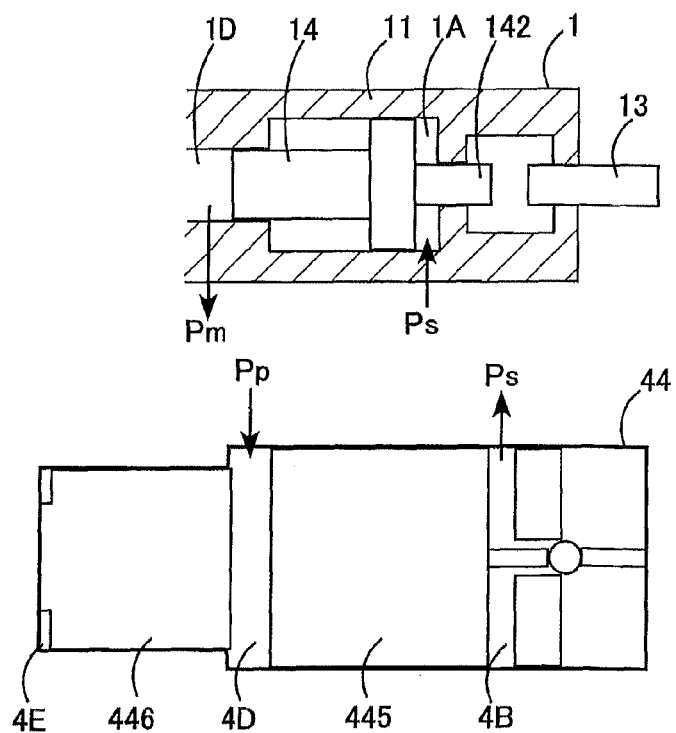
FIG. 6 is a cross sectional view illustrating pressure states of the master cylinder and the regulator while the input piston and the master piston illustrated in FIG. 1 are in a separated state.

Here, the estimation of the accurate master pressure is explained with reference to FIG. 6. As shown in FIG. 6, in the case that the front end surface of the input piston 13 of the master cylinder 1 is in the separated state relative to the rear end surface of the projection portion 142 of the first master piston 14, a master pressure Pm of the first master chamber 1D is controlled by the servo pressure Ps of the servo chamber 1A. More specifically, the master pressure Pm is a value obtained by multiplying the servo pressure Ps by a cross-sectional area of the servo chamber 1A and then divided by a cross-sectional area of the pressure applying portion of the first master piston 14. In this embodiment, because the cross-sectional area of the pressure applying portion of the first master piston 14 is formed to be equal to the cross-sectional area of the servo chamber 1A, the master pressure Pm becomes equal to the servo pressure Ps.

The servo pressure Ps of the servo chamber 1A is the servo pressure Ps generated at the second chamber 4B (the servo pressure generating chamber) of the regulator 44 and is generated by a pilot pressure Pp of the pressure control chamber 4D (the first pilot chamber). Accordingly, when the pilot pressure Pp of the pressure control chamber 4D increases, the control piston 445 slides towards the cylinder base surface (i.e. in the right direction in FIG. 6), and the servo pressure Ps of the second chamber 4B increases. Then, the servo pressure Ps of the servo chamber 1A also increases so as to follow the pressure increase at the second chamber 4B. Additionally, although the pressure at the fourth chamber 4E (the second pilot chamber) increases, the sub-piston 446 does not move because the pressure at the pressure control chamber 4D also increases.

A balance of pressures at the regulator 44 is expressed by the following equation (2), where the cross-sectional area of the second chamber 4B is represented by S1, and the cross-sectional area of the pressure control chamber 4D is represented by S2.

$$Ps = Pp \cdot S2/S1 \qquad (2)$$

A mentioned above, because the master pressure Pm is equal to the servo pressure Ps, the estimated master pressure Pm may be expressed by the following equation (3).

$$Pm = Ps = Pp \cdot S2/S1 \qquad (3)$$

Accordingly, the master pressure Pm can be estimated on the basis of the pilot pressure Pp, which is a command value from the brake ECU 6, and a first servo ratio S2/S1, which is a cross-sectional area ratio between the cross-sectional area S2 of the pressure control chamber 4D and the cross-sectional area S1 of the second chamber 4B. The first servo ratio S2/S1 is preliminarily obtained and memorized in the brake ECU 6. In this embodiment, the friction brake system B is formed so that the cross-sectional area S1 of the second chamber 4B and the cross-sectional area S2 of the pressure control chamber 4D is equal to each other, therefore the first servo ratio S2/S1 is one (1). Alternatively, the friction brake system B may be configured so that the servo pressure Ps is detected by the pressure sensor 74 in order to estimate the master pressure Pm.

Figure 7:
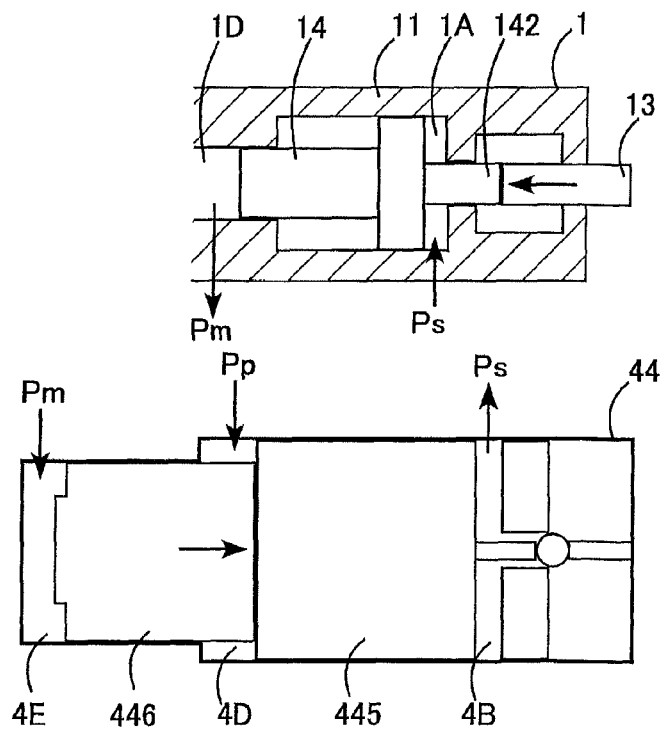
FIG. 7 is a cross sectional view illustrating the pressure states of the master cylinder and the regulator while the input piston and the master piston illustrated in FIG. 1 are in a contact state.

As shown in FIG. 7, while the front end surface of the input piston 13 of the master cylinder 1 contacts the rear end surface of the projection portion 142 of the first master piston 14, the master pressure Pm of the first master chamber 1D is controlled by the servo pressure Ps of the servo chamber 1A and the pressing force applied to the brake pedal 10. The servo pressure Ps of the servo chamber 1A is the servo pressure Ps generated at the servo pressure generating chamber 4B of the regulator 44 and is generated by the pressure (the master pressure Pm) of the fourth chamber 4E and the pilot pressure Pp of the pressure control chamber 4D. In other words, the pressure of the fourth chamber 4E increases in response to the increase of the master pressure Pm of the first master chamber 1D. The pressure at the fourth chamber 4E is greater than the pilot pressure Pp at the pressure control chamber 4D by the pressing force applied to the brake pedal 10. Accordingly, as the pressure of the fourth chamber 4E increases, the sub-piston 446 slidably moves towards the cylinder base surface (in the right direction in FIG. 7), thereby the sub-piston 446 contacts the control piston 445 and slidably moves towards the cylinder base surface (in the right direction in FIG. 7) together with the control piston 445. Then, the pressure of the servo pressure generating chamber 4B increases, and the servo pressure Ps of the servo chamber 1A also increases.

The balance of the pressures at the regulator 44 in the above-mentioned state is expressed by the following equation (4), where the cross-sectional area of the fourth chamber 4E is represented by S3. Additionally, the cross-sectional area S3 of the fourth chamber 4E is formed to be smaller than the cross-sectional area S1 of the servo pressure generating chamber 4B.

$$Pm \cdot S3 + Pp(S1-S3) = Ps \cdot S1 \qquad (4)$$

The estimated master pressure Pm may be expressed by the following equation (5) from the equation (4).

$$Pm = Ps \cdot S1/S3 - Pp(S1-S3)/S3 \qquad (5)$$

Accordingly, the master pressure Pm may be estimated on the basis of the servo pressure Ps, the pilot pressure Pp, and a second servo ratio S3/S1, which is a cross-sectional area ratio between the fourth chamber 4E and the second chamber 4B. The second servo ratio S3/S1 is preliminarily calculated and memorized in the brake ECU 6.

(A First Process of Estimating the Master Pressure)

Figure 8:
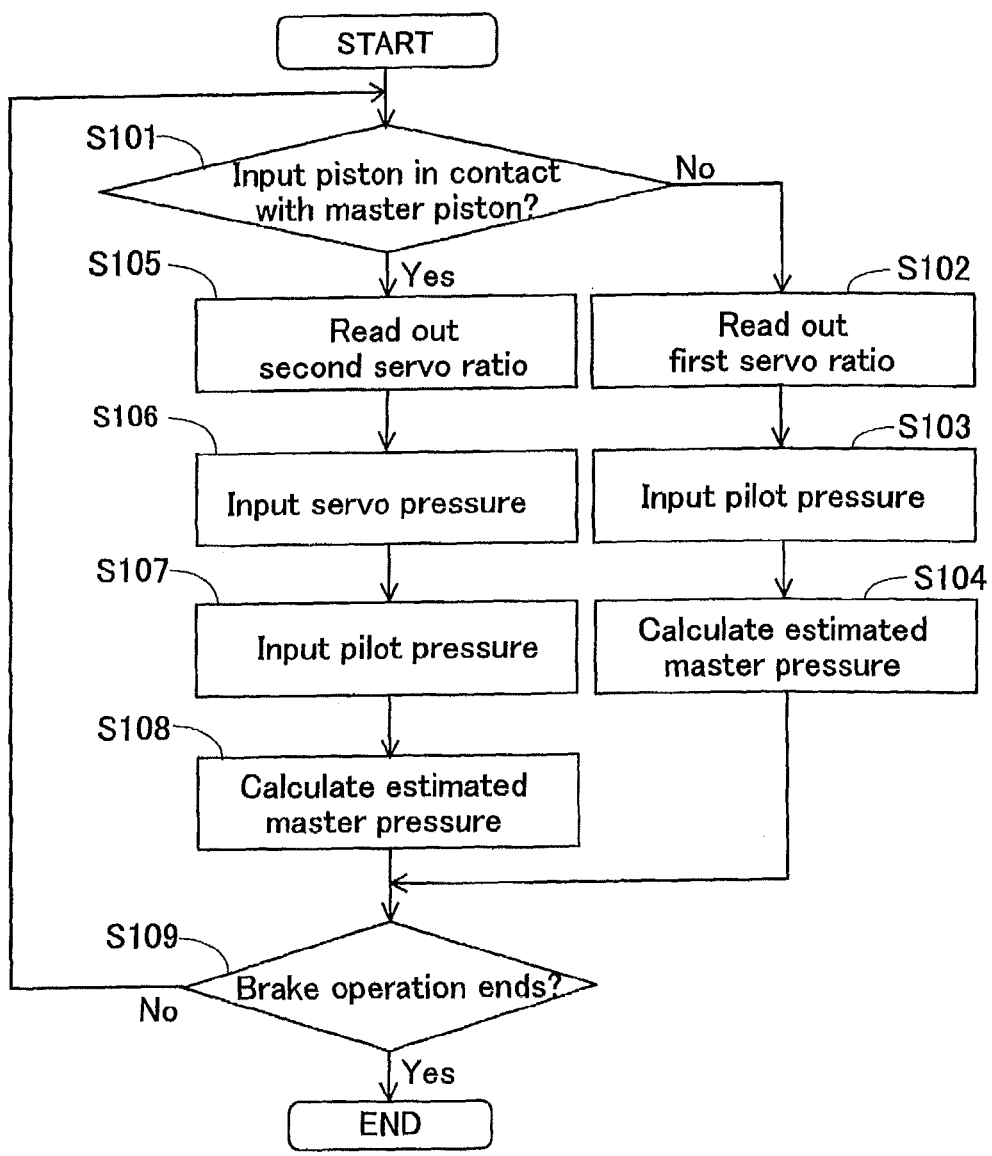
FIG. 8 is a flowchart of a master pressure estimation process, which is a control program executed by the brake ECU illustrated in FIG. 1.

A control operation for estimating the master pressure while the front end surface of the input piston 13 of the master cylinder 1 is in the contact/separates states relative to the rear end surface of the projection portion 142 of the first master piston 14 will be explained below with reference to FIG. 8. As shown in FIG. 8, the brake ECU 6 determines whether or not the front end surface of the input piston 13 contacts the rear end surface of the projection portion 142 of the first master piston 14 (S101). In the case that the front end surface of the input piston 13 does not contact the rear end surface of the projection portion 142 of the first master piston 14, the brake ECU 6 reads out the first servo ratio S2/S1 (S102), and inputs the command value of the pilot pressure Pp (S103). Then, the master pressure Pm is estimated from the equation (3) on the basis of the pilot pressure Pp and the first servo ratio S2/S1 (S104).

On the other hand, in the case that the front end surface of the input piston 13 contacts the rear end surface of the projection portion 142 of the first master piston 14 in step S101, the second servo ratio S3/S1 is read out (S105), the servo pressure Ps is inputted from the pressure sensor 74 (S106), and the command value of the pilot pressure Pp is inputted (S107). Then, the brake ECU 6 estimates the master pressure Pm from the equation (5) on the basis of the servo pressure Ps, the pilot pressure Pp and the second servo ratio S3/S1 (S108).

Then, the brake ECU 6 determines whether or not the brake operation has ended (S109). In the case that the brake operation has not ended, the control operation returns to step S101, and the above-mentioned processes are repeated. On the other hand, in the case that the brake operation is determined to have ended, all the processes are terminated.

The control shown in FIG. 8 explains the case that the first servo ratio and the second servo ratio are immediately switched upon the estimation of the contact state and the separated state of the front end surface of the input piston 13 of the master cylinder 1 relative to the rear end surface of the projection portion 142 of the first master piston 14. Alternatively, the brake ECU 6 may be configured to calculate a third servo ratio within a range between the first servo ratio and the second servo ratio depending on the level of the contact, which is explained in the above-mentioned second process of estimating the contact of the input piston (the separation estimation reference line, the contact estimation 50% reference line, the return-side contact estimation 50% reference line, and the contact estimation 100% reference line), and to estimate the master pressure Pm on the basis of the third servo ratio, the servo pressure Ps and the pilot pressure Pp.

(A Second Process of Estimating the Master Pressure)

Figure 9:
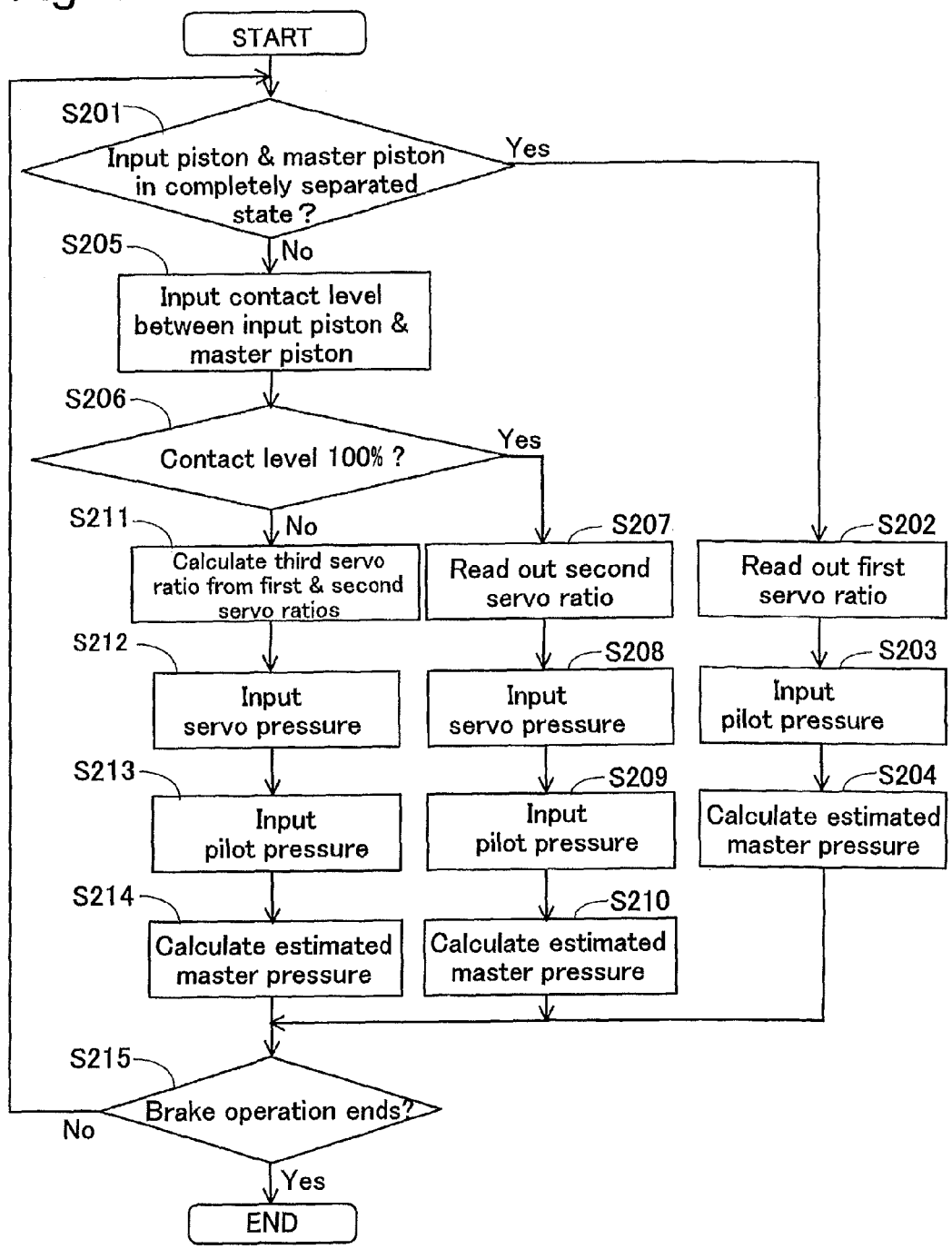
FIG. 9 is a flowchart of another example of the master pressure estimation process, which is executed by the brake ECU illustrated in FIG. 1.

The control process of the second process of estimating the master pressure is explained here with reference to FIG. 9. As shown in FIG. 9, the brake ECU 6 determines whether or not the front end surface of the input piston 13 is in the completely separated state relative to the rear end surface of the projection portion 142 of the first master piston 14 (S201). In the case that the front end surface of the input piston 13 is in the completely separated state relative to the rear end surface of the projection portion 142 of the first master piston 14, the first servo ratio S2/S1 is read out (S202), and the command value of the pilot pressure Pp is inputted (S203). Then, the master pressure Pm is estimated from the equation (3) on the basis of the pilot pressure Pp and the first servo ratio S2/S1 (S204).

On the other hand, in the case that the front end surface of the input piston 13 is not in the completely separated state relative to the rear end surface of the projection portion 142 of the first master piston 14, the contact level is inputted (S205). Then, the brake ECU 6 determines whether or not the contact level is 100% (S206). In the case that the contact level is 100%, the second servo ratio S3/S1 is read out (S207), the servo pressure Ps is inputted from the pressure sensor 74 (S208), and the command value of the pilot pressure Pp is inputted (S209). Then, the brake ECU 6 estimates the master pressure Pm from the equation (5) on the basis of the servo pressure Ps, the pilot pressure Pp, and the second servo ratio S3/S1 (S210).

On the other hand, in the case that the contact level is not 100% in step S206, the brake ECU 6 calculates the third servo ratio within the range between the first servo ratio and the second servo ratio depending on the contact level (S211). Then, the servo pressure Ps is inputted from the pressure sensor 74 (S212), and the command value of the pilot pressure Pp is inputted (S213). Then, the brake ECU 6 estimates the master pressure Pm from the equation (5) replacing the second servo ratio with the third servo ratio, on the basis of the servo pressure Ps, the pilot pressure Pp, and the third servo ratio (S214).

The brake ECU 6 determines whether or not the brake operation has ended (S215). In the case that the brake operation has not ended, the control operation returns to step S201 and the above-mentioned processes are repeated. On the other hand, in the case that the brake operation has ended, all the processes are terminated.

An Explanation on Advantages and Effects of the Embodiment

As is evident from the above-described explanations, in the case that the brake pedal 10 is slowly pressed, the first master piston 14 and the input piston 13 are in the separated state, and the master pressure Pm of the first master chamber 1D is generated only by the servo pressure Ps of the servo chamber 1A. The servo pressure Ps of the servo chamber 1A is the servo pressure Ps generated at the servo pressure generating chamber 4B. The servo pressure Ps is generated at the servo pressure generating chamber 4B only by the pilot pressure Pp of the pressure control chamber 4D while the above-mentioned separated state is established. Accordingly, the accurate master pressure may be estimated on the basis of the pilot pressure Pp and the first servo ratio S2/S1, which is the cross-sectional area ratio between the pressure control chamber 4D and the servo pressure generating chamber 4B.

On the other hand, in the case that the brake pedal 10 is pressed hard and suddenly, the master piston 14 and the input piston 13 are in the contact state, and the master pressure Pm of the first master chamber 1D is generated by the pressure, which is the sum of the servo pressure Ps of the servo chamber 1A and the pressing force applied to the brake pedal 10. The master pressure Pm is returned to the fourth chamber 4E and generates the servo pressure Ps at the servo pressure generating chamber 4B together with the pilot pressure Pp of the pressure control chamber 4D. Accordingly, the accurate master pressure Pm may be estimated on the basis of the servo pressure Ps, the pilot pressure Pp, and the second servo ratio S3/S1, which is the cross-sectional area ratio between the fourth chamber 4E and the servo pressure generating chamber 4B. As a result, the performance of the brake control such as the ABS and the like may be enhanced. Furthermore, because an additional sensor for detecting the master pressure Pm is not necessary, the brake system may be manufactured with lower costs.

The brake ECU 6 calculates the third servo ratio within the range between the first servo ratio S2/S1 and the second servo ratio S3/S1 depending on the determined contact level. Accordingly, the master pressure Pm may be more accurately estimated compared to the case where the master pressure Pm is estimated by switching the first and second servo ratios S2/S1, S3/S1, which are constant in the separated state.

The regulator 44 of the embodiment includes at least the first chamber 4A, which is defined within the cylinder 441 and which is in communication with the accumulator 431 (the pressure accumulating portion), the second chamber 4B, which is defined within the cylinder 441 and which is in communication with the servo chamber 1A, the pressure control chamber 4D, which is defined within the cylinder 441 and which is in communication with the pressure increasing valve 42 and the pressure reducing valve 41, and the fourth chamber 4E (the pressure receiving chamber), which is defined within the cylinder 441 and which is in communication with the first master chamber 1D. It is enough for the regulator 44 to include the piston 445, or the pistons 445 and 446, which move(s) forward in response to the pressure increase at the pressure control chamber 4D or the pressure increase at the fourth chamber 4E, and the valve portions 442, 443, 444, which establish the communication between the first chamber 4A and the second chamber 4B in response to the forward movement of the piston(s). Additionally, an operating force sensor may be provided instead of the stroke sensor 72, and the operating force applied to the brake pedal 10 may be used in the control instead of the stroke amount, or the operating force sensor may be provided in addition to the stroke sensor 72, and both of the operating force and the stroke amount may be used.

In the above-described embodiment, the stroke sensor 72, which is an input piston movement detecting portion that detects the amount of movement of the input piston 13, is arranged in the vicinity of the brake pedal 10 and is a sensor that detects the stroke amount of the brake pedal 10. Alternatively, the input piston movement detecting portion may be provided in the vicinity of the input piston 13 in order to directly detect the amount of movement (i.e. the stroke amount, the operation amount) of the input piston 13.

In the above-described embodiment, a brake operating member, which transmits the operating force of the driver to the input piston 13, is the brake pedal 10. However, the brake operating member is not limited to the brake pedal 10. Alternatively, a brake lever or a brake handle may be adapted as the brake operating member. The technical ideas of the present invention are adaptable even when the vehicle brake system (the friction brake system) disclosed in the embodiment is adapted to an automated two-wheeled vehicle or other vehicles.

The vehicle brake system according to the present invention is adaptable to a vehicle brake system where the input piston and the master piston are held in the separated state.

The invention claimed is:

1. A vehicle brake system comprising:

a cylinder;

a master piston fitted into the cylinder while being allowed to be slidably movable in an axial direction and including a pressure applying piston and a projection portion, the pressure applying piston defining a master chamber, through which a master pressure is applied to a plurality of wheel cylinders, together with a front portion of the cylinder, and the projection portion provided at a location rearward of the pressure applying piston, penetrating an intermediate wall of the cylinder so as to project rearward, and having a smaller diameter than the cylinder;

an input piston penetrating a rear wall of the cylinder while being allowed to be slidably movable in the axial direction, and a front end surface of the input piston being spaced apart from rear end surface of the projection portion of the master piston located at a retreated end position by a predetermined distance while the input piston is located at a retreated end position;

a servo chamber formed between a rear shoulder portion, which is provided between the pressure applying piston and the projection portion, and the intermediate wall of the cylinder;

a contact/separation determining means determining a separated state where the front end surface of the input piston and the rear end surface of the projection portion are spaced apart from each other, and a contact state where a contact therebetween is established;

a pilot pressure generating device generating a pilot pressure corresponding to an amount of movement of the input piston;

a servo pressure generating device including a first valve body fitted into a first valve bore formed at a housing while being allowed to be slidably movable and dividing the first valve bore into a first pilot chamber in communication with the pilot pressure generating device and a servo pressure generating chamber in communication with the servo chamber, a valve mechanism connecting the servo pressure generating chamber either with a pressure accumulating device or a reservoir in response to a movement of the first valve body, and a second valve body fitted into a second valve bore, which is formed at the housing so as to extend from the first valve bore and to have a smaller diameter than the first valve bore, while allowing the second valve body to contact/separate with/from the first valve body and dividing the second valve bore into the first pilot chamber and a second pilot chamber in communication with the master chamber;

a servo pressure measuring device measuring the servo pressure; and a master pressure estimating means estimating the master pressure on the basis of the pilot pressure and a first servo ratio, which is a cross-sectional area ratio between the first pilot chamber and the servo pressure generating chamber, in a case that the contact/separation determining means determines the separated state, and estimating the master pressure on the basis of the servo pressure measured by the servo pressure measuring device, the pilot pressure and a second servo ratio, which is a cross-sectional area ratio between the second pilot chamber and the servo pressure generating chamber, in a case that the contact/separation determining means determines the contact state.

2. The vehicle brake system according to claim 1, wherein the contact/separation determining means determines a level of the contact between the front end surface of the input piston and the rear end surface of the projection portion, and the master pressure estimating means calculates a third servo ratio within a range between the first servo ratio and the second servo ratio depending on the level of the contact determined by the contact/separation determining means and estimates the master pressure on the basis of the measured servo pressure, the pilot pressure and the third servo ratio.

* * * * *